US008013229B2

(12) United States Patent  
Xu

(10) Patent No.: US 8,013,229 B2
(45) Date of Patent: Sep. 6, 2011

(54) AUTOMATIC CREATION OF THUMBNAILS FOR MUSIC VIDEOS

(75) Inventor: Changsheng Xu, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 780 days.

(21) Appl. No.: 11/996,188

(22) PCT Filed: Jul. 22, 2005

(86) PCT No.: PCT/SG2005/000247
§ 371 (c)(1),
(2), (4) Date: Mar. 19, 2008

(87) PCT Pub. No.: WO2007/011308
PCT Pub. Date: Jan. 25, 2007

(65) Prior Publication Data
US 2008/0209484 A1   Aug. 28, 2008

(51) Int. Cl.
*A63H 5/00* (2006.01)
*G04B 13/00* (2006.01)
*G10H 7/00* (2006.01)
(52) U.S. Cl. ...................................................... 84/609
(58) Field of Classification Search .................. 84/609, 84/645
See application file for complete search history.

(56) References Cited

U.S. PATENT DOCUMENTS

| | | | | |
|---|---|---|---|---|
| 6,225,546 B1 * | 5/2001 | Kraft et al. | ...................... | 84/609 |
| 6,998,527 B2 * | 2/2006 | Agnihotri | ...................... | 84/609 |
| 7,371,958 B2 * | 5/2008 | Kim et al. | ...................... | 84/609 |
| 7,386,357 B2 * | 6/2008 | Zhang | ...................... | 700/94 |
| 7,599,554 B2 * | 10/2009 | Agnihotri et al. | ............. | 382/173 |
| 2003/0233929 A1 * | 12/2003 | Agnihotri | ...................... | 84/609 |
| 2005/0031311 A1 | 2/2005 | Bak et al. | | |
| 2006/0210157 A1 * | 9/2006 | Agnihotri et al. | ............. | 382/173 |

FOREIGN PATENT DOCUMENTS

| | | |
|---|---|---|
| WO | WO 2004/001626 A1 | 12/2003 |
| WO | WO 2004/090752 A1 | 10/2004 |
| WO | WO 2007011308 A1 * | 1/2007 |

OTHER PUBLICATIONS

Lalitha Agnihotri et al., "Music Videos Miner", MM'03, Nov. 2-8, 2003, Berkeley California, USA, ACM 1-58113-722-2/03/0011, pp. 442-443.
Xi Shao et al., "Automatic Music Summarization in Compressed Domain", Institute for Infocomm Research, 21 Heng Mui Keng Terrace, Singapore 119613.

(Continued)

*Primary Examiner* — Jeffrey Donels
(74) *Attorney, Agent, or Firm* — Stephen A. Bent; Foley & Lardner LLP

(57) ABSTRACT

There is provided a method for automatically creating a music video thumbnail (50) from a music video signal (12). The music video signal is separated into a music signal (16) and a video signal (18). The music signal is analysed by detecting similarity regions and the sections of the music signal corresponding to the chorus are extracted (20). The video signal is analysed by detecting repeated lyrics (34). The extracted chorus sections from the music signal and the sections of the video signal containing repeated lyrics are then matched. A matched pair is then selected for use in the music video thumbnail and the timing of the pair are aligned (42) to form the thumbnail.

15 Claims, 18 Drawing Sheets

OTHER PUBLICATIONS

Lalitha Agnihotri et al., "Design and Evaluation of a Music Video Summarization System", 2004 IEEE International Conference on Multimedia and Expo (ICME), 2004, pp. 1943-1946.

Changsheng Xu et al., "Automatic Music Video Summarization Based on Audio-Visual-Text Analysis and Alignment", SIGIR'05, Aug. 15-19, 2005, Salvador Brazil, pp. 361-368.

Xi Shao et al., "Automatically Generating Summaries for Musical Video", Proc. 2003 International Conference on Image Processing, vol. 2, pp. 547-550, Sep. 2003.

Xi Shao et al., "A New Approach to Automatic Music Video Summarization" 2004 International Conference on Image Processing (ICIP), pp. 625-628.

* cited by examiner

AUTOMATIC CREATION OF THUMBNAILS FOR MUSIC VIDEOS

FIELD OF THE INVENTION

This invention relates generally to multimedia content analysis, and in particular to the generation of thumbnails for music videos.

BACKGROUND

Since the 1980s, the music video has increased in popularity and influence, and attracted greater audiences from a wide range of age groups. The style and content of music videos have strongly influenced advertising, television, film, and popular culture as a whole.

With ongoing technological advancements in multimedia content capture, storage, high bandwidth/speed transmission and compression standards, the production and distribution of music videos have increased rapidly and become more accessible to users. Nowadays, many music content providers provide users with the opportunity to purchase music videos though websites. It is useful to allow a customer to view highlights of a music video to assist in a purchasing decision. Such highlights may be referred to as a music video thumbnail. Thumbnails, enable a customer to be more informed, and more likely to make a correct purchase, thus increasing satisfaction and resulting in a greater likelihood of repeat purchase.

Thumbnails are available on music websites, and generally are generated manually. As the volume of music videos increases to meet the demands of consumers, the task of manually generating music video thumbnails becomes very labour-intensive and an inefficient use of time. Thus it is desirable to automatically create concise, accurate and informative thumbnails for original music videos.

Present efforts of automatic music summarisation may be classified into either machine learning-based approaches and pattern based approaches. Machine learning approaches attempt to categorize each frame of a song into groups based upon the distance between a particular frame and other frames in the song. The final thumbnail is generated based upon the group with the largest number of frames. Pattern matching approaches aim to categorize the frames based upon the content of those frames and select a pattern which is deemed to best match the required criteria. The challenge in music summarization is to determine the relevant features of the music and make the final summary correspond to meaningful sections of the music.

The known methods of video summarisation which have been successful in sport and movie video have not transferred well to music videos because the music signal, rather than the video track, is the dominant aspect.

It is a preferred object of the present inventing to overcome or at least reduce these shortcomings.

SUMMARY

In accordance with a first aspect of the present invention there is disclosed a method for automatically creating a music video thumbnail of a music video signal, comprising the steps of:
separating the music video signal into a music signal and video signal;
extracting the sections of the music signal corresponding to the chorus by detecting similarity regions;
determining repeated lyrics in the video signal;
matching repeated lyrics with the corresponding chorus section;
selecting a repeated lyrics and chorus pair; and
aligning said selected pair to create said music video thumbnail.

There is further disclosed a system and computer program product with means and code means, respectively, for performing the method steps above.

BRIEF DESCRIPTIONS OF THE DRAWINGS

One or more embodiments of the present invention will now be described with reference to the accompanying drawings, in which.

DETAILED DESCRIPTION OF PREFERRED EMBODIMENTS

Figure 1:
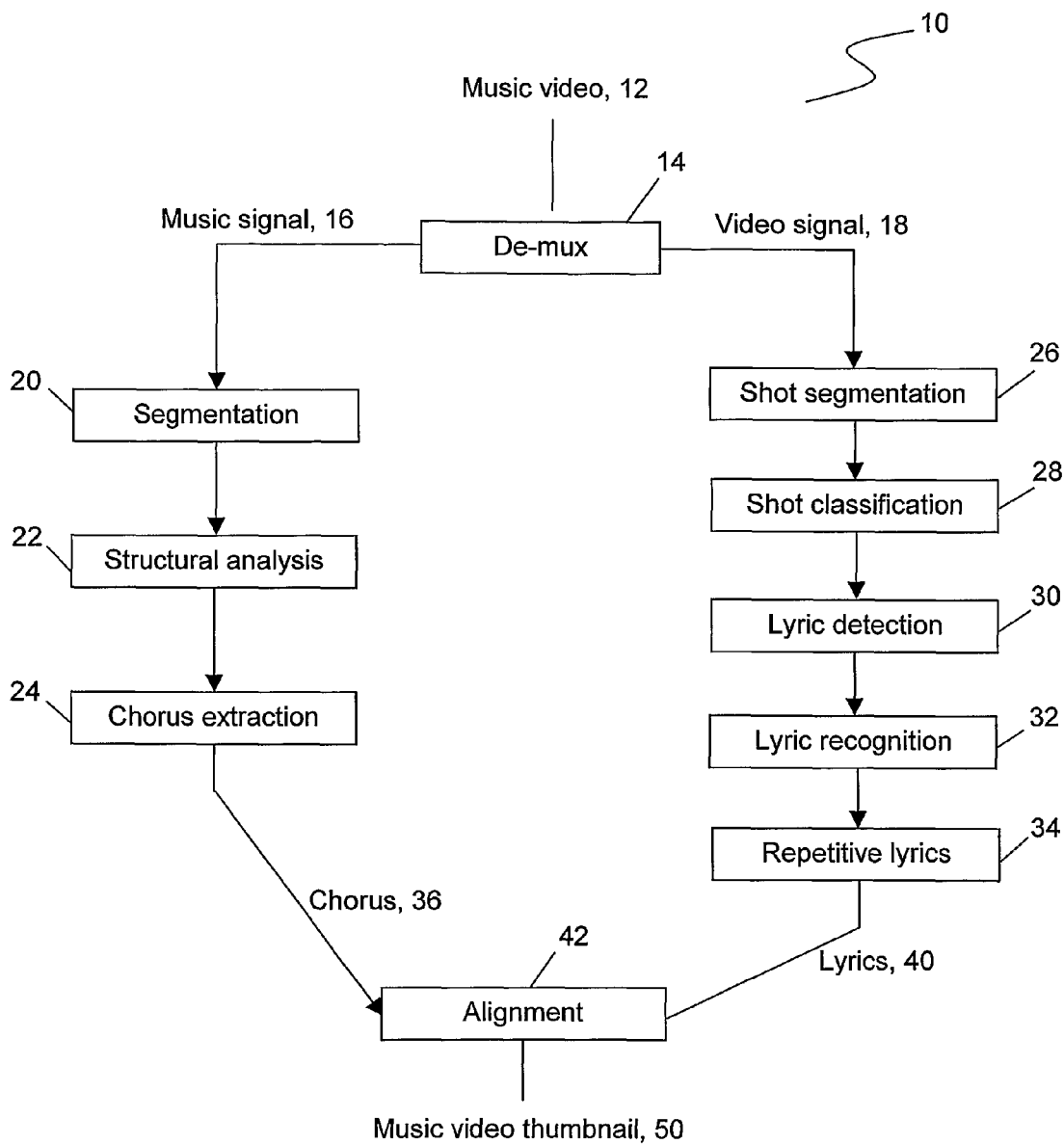
FIG. 1 illustrates a conceptual block diagram of music video thumbnail creation.

Where reference is made in any one or more of the accompanying drawings to steps and/or features, which have the same reference numerals, those steps and/or features have for the purposes of this description the same functions and/or operations, unless the contrary intention appeals.

Overview

FIG. 1 shows a flowchart 10 illustrating the general sequence of events which may used to generate a music video thumbnail of a music video 12. The music video 12 is first separated into a music signal 16 and a video signal 18. This separation is achieved by use of a de-multiplexer 14 or equivalent.

The music signal 16 undergoes segmentation (step 20) and structural analysis (step 22) to determine regions of similarity based upon both melody and content (vocals). The determination of similarity regions (step 24) allows particular sections, such as the chorus 36 (or verse), to be detected. It is preferable that the chorus 36 is used to generate the music video thumbnail as it is the section of a song that is most recognised by listeners.

To extract the video signal corresponding to the chorus 36, the video signal 18 is segmented (step 26) and classified (step 28) into either a close-up face shot or a non-face shot. The lyrics are then detected (step 30) from the classified shots, and undergo lyric recognition (step 32). Repetitive lyrics are then selected (step 34) for use in the music video thumbnail 50.

The music video thumbnail 50 is generated by aligning (step 42) and combining the appropriate boundaries of the detected chorus 36 in the music signal 16 and the repetitive lyrics 40 from the video signal 18.

Music Analysis
Chorus Extraction

Figure 2:
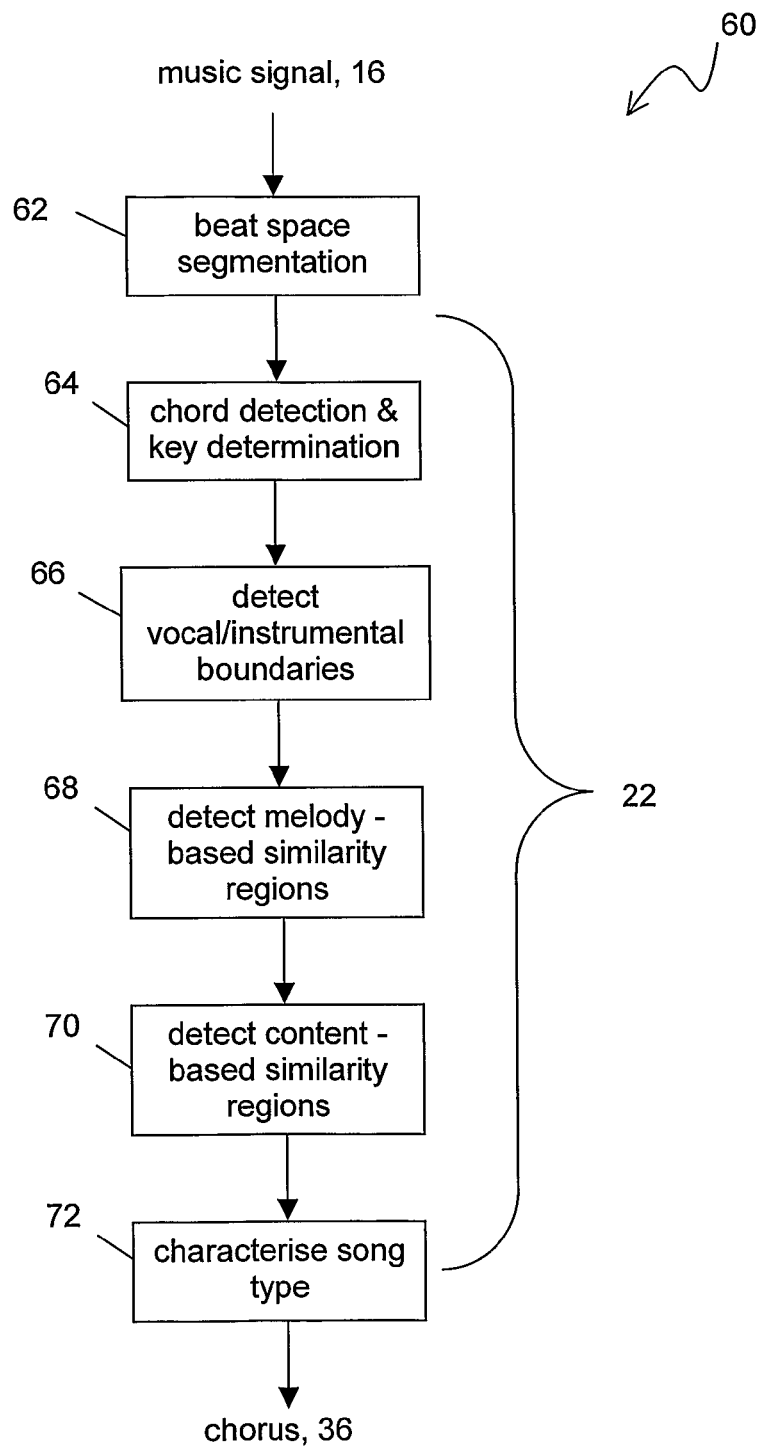
FIG. 2 is a flow-chart illustrating chorus extraction from the music signal.

FIG. 2 illustrates a process 60 which is used in the detection of the music signal structure, and thus correspond to the segmentation (step 20), structural analysis (step 22) and chorus extraction (step 24) processes of FIG. 1. Each step will be discussed in yet greater detail in later sections.

Firstly, the music signal 16 undergoes beat space segmentation (step 62) to allow similar music regions to be identified. As music structure varies greatly among, as well as within, musical genres it is necessary that a segmentation method be utilised which accommodates for such variation. Beat space segmentation (step 62) allows the music signal to be segmented by determining the length of the shortest note in the music signal 16.

To further understand the structure of the music signal 16, a chord detection process (step 64) is utilised, and musical keys are assigned to sections of the signal 16. The detection of instrumental/vocal boundaries (step 66) helps identify sections of the music signal 16 which contain vocals. Areas where the melody of the music signal sounds similar (referred to as melody-based similarity regions) are then identified (step 68). To determine if the vocals in the melody-based similarity regions are also similar, the content of the melody-based similarity regions is analysed (step 70). By applying rules about the structure of popular music signals, it is possible to characterise the type of song (step 72), and thus extract the section corresponding to the chorus 36.

Beat Space Segmentation

Audio segmentation approaches using fixed-length segments do not allow identification of particular sections of the music. When compared to a speech signal, a music signal is more heterogeneous because of the way the signal source changes as the music score progresses (e.g. from verse to chorus). An appropriate method to use on the music signal is to segment the music based on the length of the individual music notes. To conduct such a segmentation usually requires an accurate onset detector to find all the note onsets in the music signal. The polyphonic nature of music signals 16 means that detecting note onsets is difficult. In reality, even very accurate onset detectors cannot guarantee that all onsets will be detected.

To avoid having to detect every note onset, a method of segmentation based on the shortest note duration is utilised. Music is usually measured as a number of bars, which are typically defined by the timing of strong note onsets. The shortest length notes (such as eighth or sixteenth notes) are usually played in the bars to align the melody of the music with the rhythm of the lyrics and to fill the gaps between lyrics. The present segmentation method detects the length of the shortest note in the song and segments the music signal 16 into frames, the length of each frame based upon the duration of time between the shortest length notes. This is known as of beat space segmentation (BSS).

Figure 3:
FIG. 3 illustrates fundamental frequencies (F0) of music notes and their placement in the octave scale sub-bands.

When detecting the shortest note duration for BSS, it is necessary to consider the music signal 16 in terms of frequency components. Since the harmonic structure of music is in octaves, it is preferable to decompose the frequency spectrum into 8 sub-bands, as an example. FIG. 3 illustrates the frequency ranges chosen to segment the frequency spectrum into octaves.

Shortest Note Duration Detection

Figure 4:
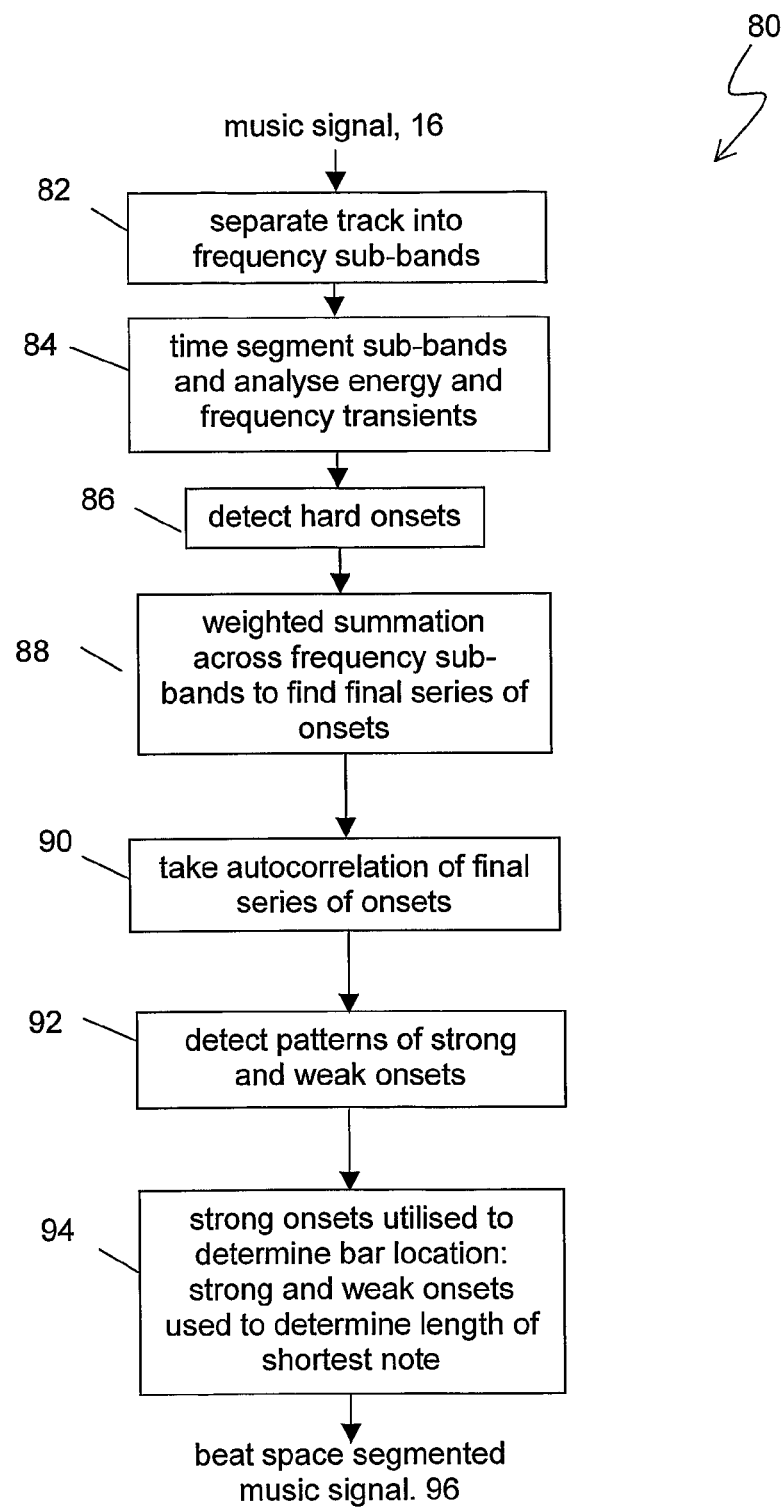
FIG. 4 is a flow chart illustrating the steps in beat space segmentation of a music signal.

FIG. 4 is a flow diagram illustrating the process 80 of detecting the shortest note duration for beat space segmentation (i.e. step 62 in FIG. 2). The music signal 16 is firstly separated into its frequency sub-bands (step 82). A band-pass or band-step filter (or similar) can be utilized for this separation. In this example, the sub-band ranges given in FIG. 3 are used to separate the music signal 16. The sub-band signals are segmented into fixed-time intervals (step 84), for example 60 milliseconds, and preferably there is a 50% time overlap between adjacent time segments. The frequency and energy transients of each frequency sub-band fixed-time segment are taken to determine the sub-band onsets (step 86). When analysing the frequency and energy transients it is necessary to consider the type of notes which are to be found in each frequency sub-band. Both the fundamentals and harmonics of much popular music are strongest in sub-bands 1-4. The frequency transients in these sub-bands are determined by calculating the progressive distances between the spectrum of each sub-band. To reduce the effect of strong frequency components generated by percussion instruments and bass-clef musical notes, the spectrums from sub-bands 3 and 4 are locally normalized before measuring the distances between the spectrums. The energy transients are computed for sub-bands 5-8. After calculating the frequency and energy transients, a window preferably 100 ms in length, is run over both the energy and frequency transients. A threshold is then set and transients below the threshold a disregarded. It has been found that a suitable threshold is 75% of the maximum strength. The filtered energy and frequency transients are summed to detect the onsets in each sub-band.

To detect both hard and soft onsets in the final series of onsets, the weighted sum of onsets detected in each sub-band time interval is calculated (step 88). The weighted sum may be expressed as:

$$\text{On}(t) = \sum_{i=1}^{8} w(i) \cdot Sb_i(t) \qquad (1)$$

In the above expression, On(t) is the sum of onsets detected in all eight frequency sub-bands $Sb_i(t)$ at time 't' during a song. It has been found that a suitable weighting w(i) for each sub-band, as defined in FIG. 3, may be expressed by the matrix w=[0.6, 0.9, 0.7, 0.9, 0.7, 0.5, 0.8, 0.6]. Applying the weighting to the detected onsets in each sub-band and taking the sum generates the final series of detected onsets across all the frequency sub-bands.

To determine the inter-beat length, the autocorrelation of the final series of detected onsets is taken (step 90). Equally spaced patterns of strong and weak beats among the autocorrelated onsets are used to determine the length of the inter-beat timing (step 92) of the shortest note in the music signal. Thus, a beat spaced segmented music signal 96 is generated based on the shortest note duration (step 94) without having to detect every onset in the music signal. By utilising musical theory, it is then possible to group beat space segments into Bars, of equal measure.

Figure 5:
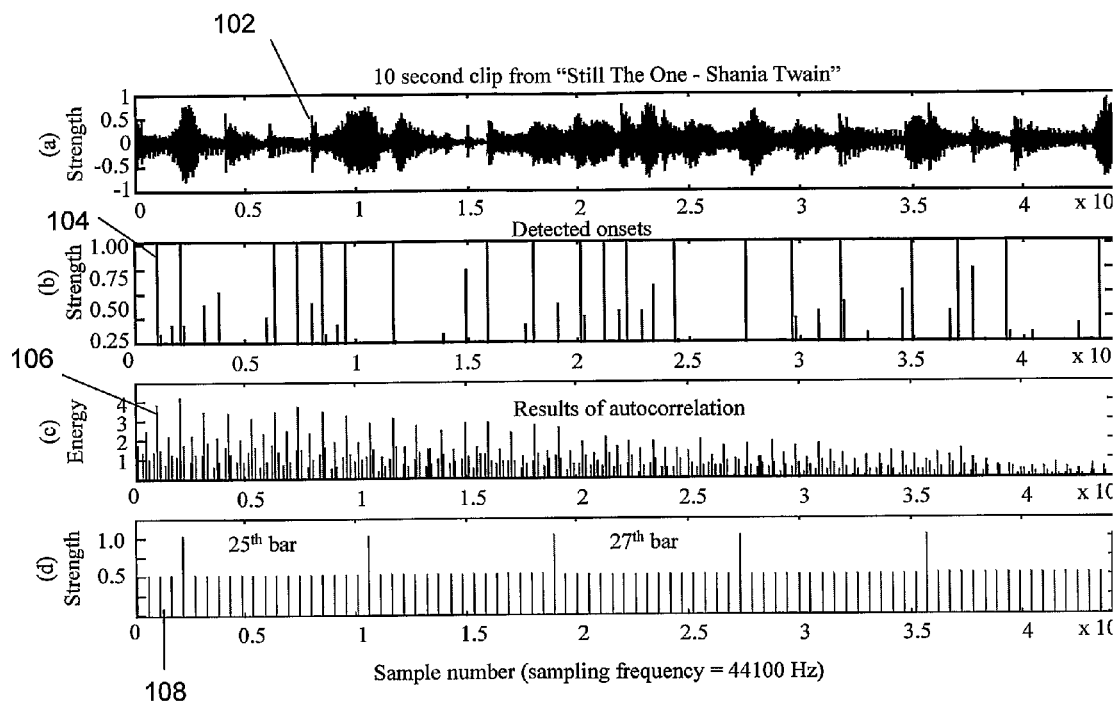
FIG. 5 illustrates a music signal, detected onsets, autocorrelation over detected onsets, and beat space segmentation.

FIG. 5 is a time scale of a 10-second music signal 16 at various stages of the application of the above beat space segmentation step 62. FIG. 5(a) is the wave shape for the 10 second music signal. The music signal is separated into its frequency sub-bands, time segmented and the frequency and energy transients of each segment analysed to determine the frequency sub-band series of onsets. The weighted sum of the initial series of onsets is taken across each sub-band to generate the final series of detected onsets 104 shown in FIG. 5(b). FIG. 5(c) shows the results of taking the autocorrelation 106 over the detected onsets of FIG. 5(b). Equally spaced patterns of strong and weak beats among the autocorrelated onsets allow the track to be segmented into frames 108 according to the shortest note duration. FIG. 5(d) shows the results of such segmentation. The most popular bar length in popular music is 4 beats per bar and this is used to determine the bar length. With a time signature of 4/4 (which is the most popular signature for popular music), there are 4 quarter notes in a bar and also 4 beats in each bar. In this case, the shortest note length is the sixteenth note. A quarter note may be formulated by 4 sixteenth notes, and therefore there are 16 sixteenth notes in each bar.

After beat space segmentation, the frames of silence need to be detected and removed as they do not contain information relevant to the music video thumbnail. Silence is defined as a segment of imperceptible music, including unnoticeable and very short clicks. A short-energy time function is used to detect silent frames. Non-silence beat space segmented frames 108 are further analysed for chord detection and singing boundary detection as described in the following sections.

A chord is constructed by playing 3 or 4 music notes simultaneously. By detecting the fundamental frequencies (F0s) of the notes which comprise a chord, it is possible to identify a particular chord. Melody-based sections of a song often have similar chord patterns. Whilst the vocal content of these melody-based regions may differ, the envelope of the chord sequences of the verse and chorus sections are usually similar.

Polyphonic music comprises signals of different music notes played at lower and higher octaves. For example, some musical instruments have a strong third harmonic component which nearly overlaps with the $8^{th}$ semitone of the next higher octave. This overlap may contribute to erroneous chord detection as the notes may not be clearly distinguished from one another. To reduce the effect of this during the chord detection process, the music frames are first transformed into the frequency domain using a Fast Fourier Transform (FFT). It has been empirically found that a sampling frequency with a resolution of 2 Hz is sufficient for accurate chord detection.

The linear frequencies are mapped into the octave scale according to the following equation:

$$p(k) = \left[C * \log 2\left(\frac{Fs * k}{N * F_{ref}}\right)\right] \mod C \qquad (5)$$

In the above equation, $F_s$ is the sampling frequency, N is the number of FFT points, k represents the frequency transformed music frames, $F_{ref}$ is the lower bound of frequency to be considered for chord detection and C represents the number of dimensions of the mapping from the linear frequency scale to the octave scale. It has been found that setting C to 1200 provides accurate chord detection. To avoid low frequency percussion noise interfering with the chord detection, $F_{ref}$ is set to 128 Hz. The result of the above equation is then used to determine the 1200-dimensional initial PCP vectors, $PCP_{INT}(i)$, according to the following equation:

$$PCP_{INT}(i) = \sum_{k:p(k)} |X(k)|^2 \quad i = 1, 2, \ldots 1200 \qquad (3)$$

In the above equation, X(k) represents the normalized linear frequency profile which is computed from the beat space segmented frames using a FFT. It has been found that the 1200 dimension feature vector, whilst producing accurate results, reduces efficiency in chord detection due to the computational complexity in considering that many dimensions. It has been empirically found that reducing the PCP vector to 60 dimensions provides sufficient accuracy whilst significantly reducing computational complexity. To reduce the number of feature vectors, the vectors corresponding to each musical note semitone are grouped into 5 frequency bins, and the resulting 60 dimensional PCP feature vectors are found according to the following equation $$PCP(p) = \sum_{i=[20(P-1)+1]}^{20*P} PCP_{INT}(i) \quad P = 1, 2, 3 \ldots 60 \qquad (4)$$

The 60-dimensional PCP feature vectors, PCP(p), are found to be sensitive to the fundamental frequencies of musical notes, and are used to model the chords with a Hidden Markov Model (HMM)

As an example, 48 HMMs may be used to model 12 Major, 12 Minor, 12 Diminished and 12 augmented chords. Each model has 5 states including entry exit and 3 Gaussian Mixtures (GM) for each hidden state. Mixture weights, means and covariance of all GMs and initial and transition state probabilities are computed using a Baum-Welch algorithm. Then the Viterbi algorithm is applied to find the efficient path from starting to end state in the models.

The difference in the pitch of notes which comprise a chord may be small, and this may contribute to incorrect chord detection. Similarly, the final state probabilities of the HMMs corresponding to chord notes may be close to one another, and may further contribute to incorrect chord detection. To detect error chords, a rule-based method is used to determine the dominant key of a music signal section, and also allow correction of the timing, or alignment, of the chords.

Song writers often use different minor and major key combinations for particular sections of a song (e.g. minor key for Middle eight and major key for the rest). To determine the key of each section 64, an observation window is placed across the sequence of detected chords. Preferably, a window size of 16-bar lengths with an overlap of 14 bars is used, as it has been found that an observation window of this size is sufficient to identify the dominant key. Each observation window is assigned a key based upon the majority of the chords detected in that window. As the key of each observation window along the length of music signal is assigned, key changes can be detected and used to identify transitions between song sections (e.g. between verse and Middle eight).

Chords within a section which are not consistent with the dominant key are identified as error chords. The error chord is corrected by the following process:

Determine from the HMMs, the 48 chords with the highest probability of being the chord detected as the error chord, and normalize the observations.

If the observation is above a certain threshold and it is the highest observation among all chords in a key, the error chord is replaced by the chord in the same key with the next highest observation.

If there are no chords in the same key with an observation above the threshold the error chord is assigned the previous chord (in the musical sequence of detected chords).

The music signal 16 can be considered as quasi-stationary in the inter-beat times, because melody transitions usually occurs on beat times. Thus, to detect chord transitions which occur due to melody changes within the chord observation window, the following rules are applied:
1. Chords are most likely to change on beat times.
2. Chords are more likely to change on half note times than on other positions of beat times (excluding beat times).
3. Chords are more likely to change at the beginning of the measures (bars) than within the measures (bars).

Figure 6:
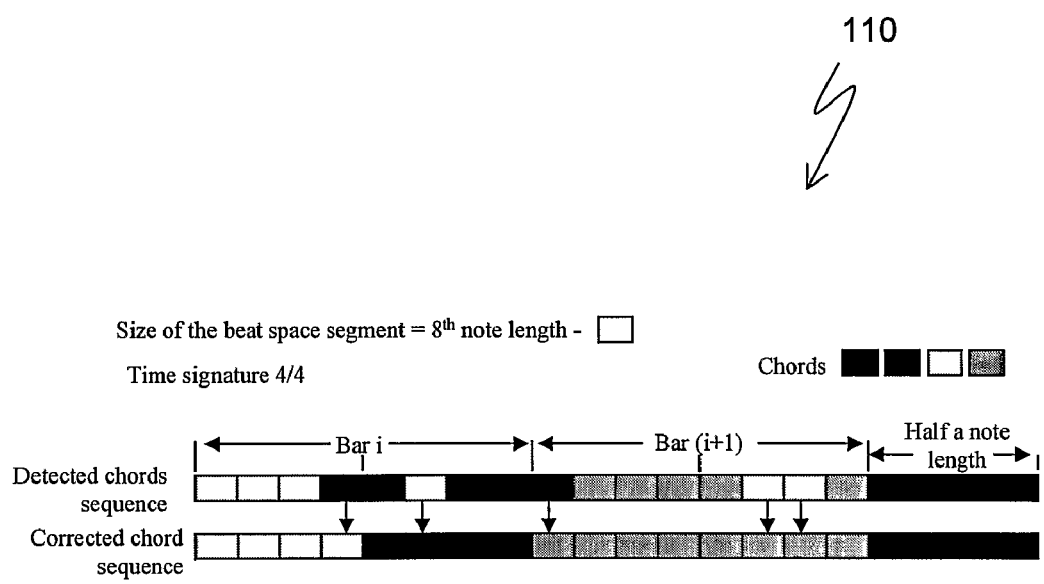
FIG. 6 illustrates an example of error correction for detected chords.

The above 3 points are explained in FIG. 6. In FIG. 6, the size of the beat space segment is eighth notes and the size of the half note is 4 beat space segments. Bar i in the detected chord sequence has two error chords detected as inconsistent with the dominant key of surrounding chords. These error chords are in frames 4 and 6 of Bar i. These chords are corrected according to the above rules, and the corrected chord sequence illustrates that after correction, the detected error chords conform with the surrounding chords. Bar (i+1) has three error chords in frames 1, 6 and 7. The corrected chord sequence again results in distinct grouping of similar chords.

Detection of Vocal and Instrumental Boundaries

Referring back to FIG. 2, the next step in extracting the chorus is detecting vocal/instrumental boundaries (step 66).

It was previously shown in FIG. 3 how the frequency range 0-22,050 Hz could be segregated into the 8 sub-bands 76 corresponding to the musical octaves 78. The entire audible spectrum has been considered to accommodate the harmonics (overtones) of the high tones when performing BSS 62. The useful range of fundamental frequencies of tones produced in a music signal is considerably less than the audible frequency range. In reality, the vocals in a musical signal are only prominent in the frequency range of approximately 80-1200 Hz.

Figure 7:
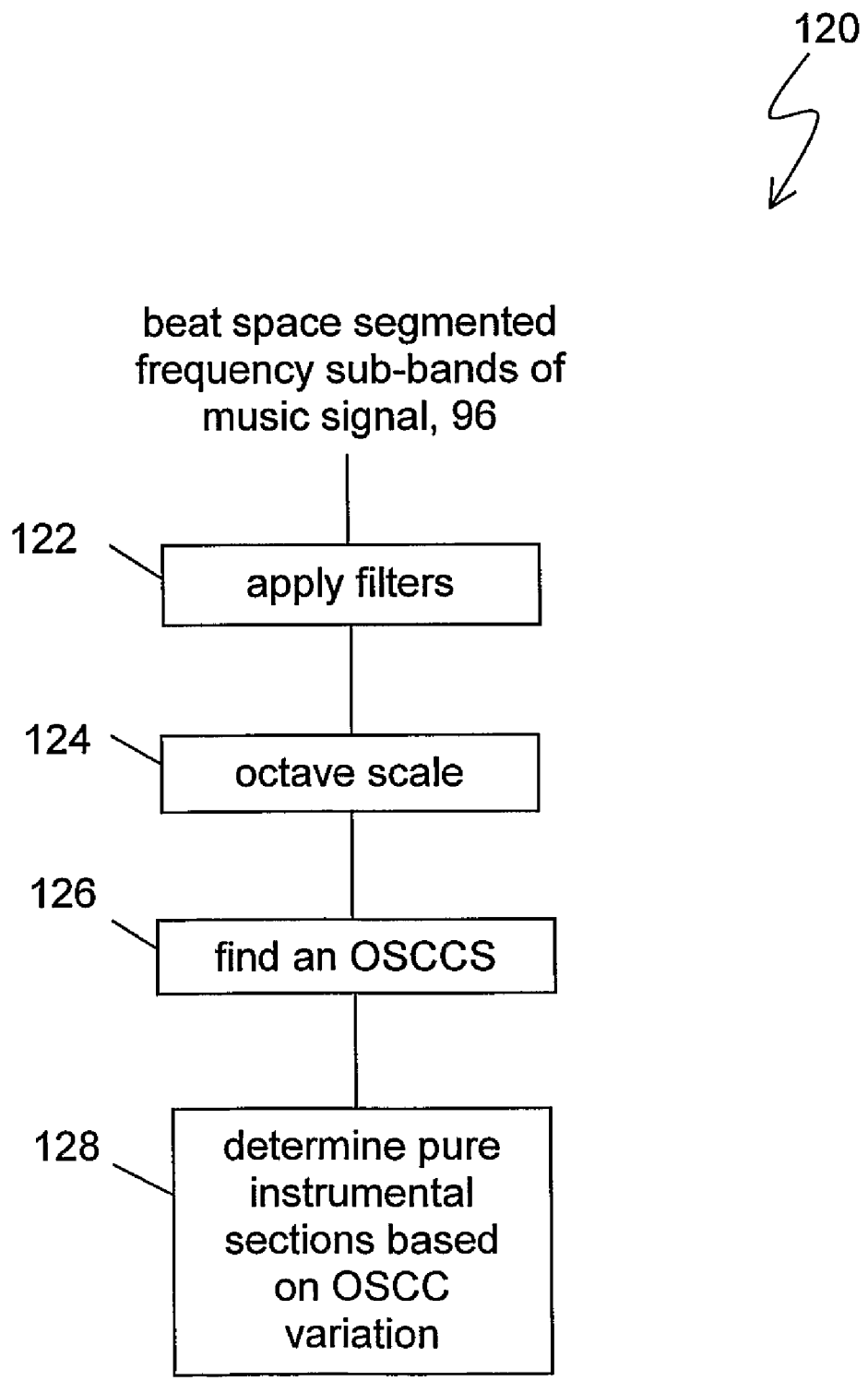
FIG. 7 is a flow-chart of how instrumental sections of the music signal are detected.

FIG. 7 illustrates a process required in determining the purely instrumental regions of a music signal. To utilise the aforementioned localisation of vocal frequencies, triangular filters are applied (step 122) to the frequency sub-bands 96 of the music signal. A greater number of filters is applied to the sub-bands corresponding to the frequency range 80-1200 Hz to obtain better resolution of the vocal content in this region.

Figures 8, 9:
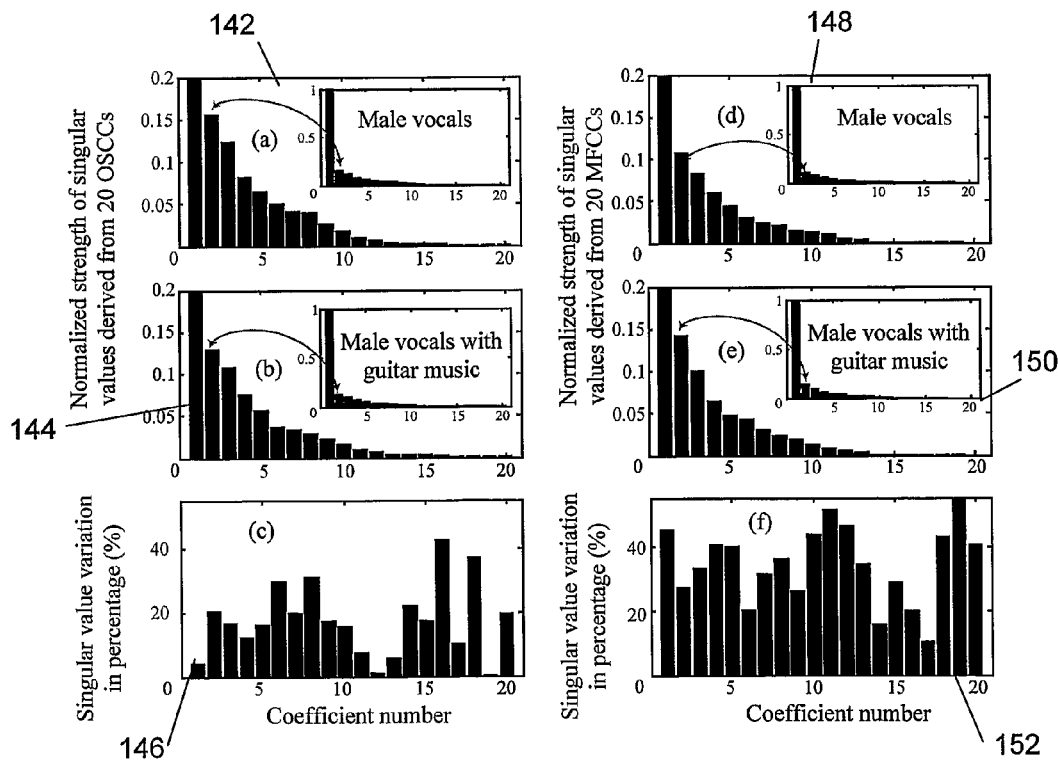
FIG. 8 illustrates the number of filters linearly spaced in sub-bands.
FIG. 9 illustrates an example of SVD analysis of the OSCCs and MFCCs extracted from both solo male track and guitar mixed male vocals.

Referring also now to FIG. 8, the preferred number of triangular filters 134 to be applied to the respective frequency sub-bands 132 is shown. To determine regions of purely instrumental music, a frequency scaling method, called the "Octave Scale", is used to calculate the cepstral coefficients of the sub-band frequency filtered frames (step 124). These cepstral coefficients are called Octave Scale Cepstral Coefficients (OSCCs). Using the "Octave scale" is found to produce superior results when compared to detection based upon the "Mel scale".

To determine the structure of the beat space segmented frames 108, the OSCCs singular values (step 128) are analysed. The singular values are derived through Singular Value Decomposition (SVD) of the OSCCs. Comparatively high singular values describe the number of dimensions which can be used to orthogonally represent the structure of the music, whilst smaller singular values indicate a highly correlated structure. The singular values thus change according to the structural variations in the music. It has been found that singular value variation utilising Octave Scale Cepstral Coefficients (OSCCs) is smaller than Mel Frequency Cepstral Coeffients (MFCCs) when analysing both pure vocal, and vocal mixed with instrumental music. This implies that OSCCs are most sensitive to music with some vocal content, and hence a smaller variation in OSCCS will indicate a region of vocal content.

FIGS. 9 (*a*), (*b*), (*d*) and (*e*) illustrate the singular value variation of 20 OSCCs and MFCCs extracted from a solo male vocal signal and a guitar mixed with male vocals signal. In these figures, the quarter note length is 662 ms and the sub-frame length is 30 ms with 50% overlap. FIG. 9(*c*) illustrates the singular value variation 146 (in percentage) of the OSCCs between the male vocal signal 142 and the guitar mixed with male vocals signal 144. FIG. 9(*f*) shows the singular value variation 152 for the single value variation in MFCCs. The lower OSCC variation 146 between signals with pure vocals and vocals mixed with instrumentals indicates that compared to MFCCs, OSCCs are more sensitive to vocals than to the instrumentals.

Singular Value Decomposition (SVD) is performed on the OSCCs of the sub-band frequency filtered to find the uncorrelated Octave Scale Cepstral Coefficients. The diagonal matrix produced by SVD is then used to determine how many coefficients are to be selected for detection of vocal boundaries. It has been empirically found that 10-16 coefficients is sufficient to distinguish sections of the music signal 16 with vocals. A support vector machine is utilized to identify the purely instrumental (PI) and instrumental mixed vocal (IMV) frames.

Similarity Region Detection

Again referring back to FIG. 2, once the vocal/instrumental boundaries have been determined (step 66), melody-based (step 68) and content based (step 70) similarity regions are detected. It will be apparent to those skilled in the art that instrumental/vocal detection may occur before, after or at the same time (processed in parallel) to detection of similarity regions, as there is no direct dependency. It will be discussed later how characterising the song type determines the sequence of detection.

Melody-Based Similarity Region Detection

Figure 10:
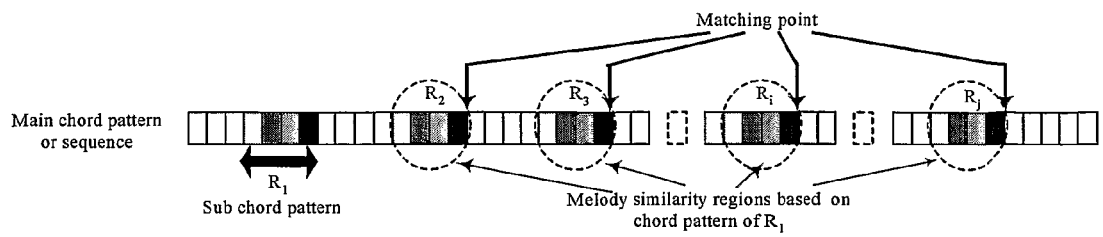
FIG. 10 illustrates the melody-based similarity region matching by dynamic programming.

Referring now to FIG. 10, there is illustrated regions $R_2, \ldots, R_i, \ldots, R_j$ which have the same chord pattern 166 (and hence similar melody) as region $R_1$. It has previously been discussed how fundamental frequency analysis can be used to detect the chords, key and chord transitions of a music signal.

Figure 11:
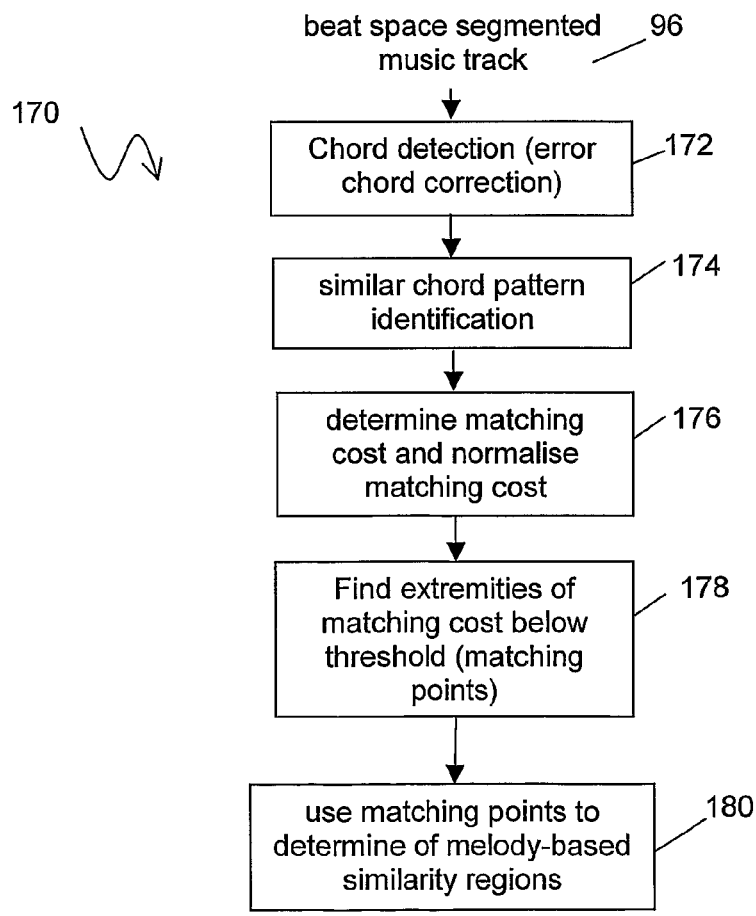
FIG. 11 is a flow chart illustrating the steps in determining melody-based similarity regions.

FIG. 11 illustrates the steps in a process 170 taken when detecting melody-based similarity regions of the beat space segmented music signal 96. Once a first chord pattern has been detected (step 172) and identified (step 174), an observation window is passed across the detected chords, and a matching cost is assigned (step 176) based on the similarity of the first chord pattern when compared against the chords in the observation window. Since it is difficult to detect all the chords correctly, chord matching errors may occur. This results in similar chord pattern detection not always having a matching cost of zero. The matching costs are normalized to determine the melody-based similarity regions (step 180).

Figure 12:
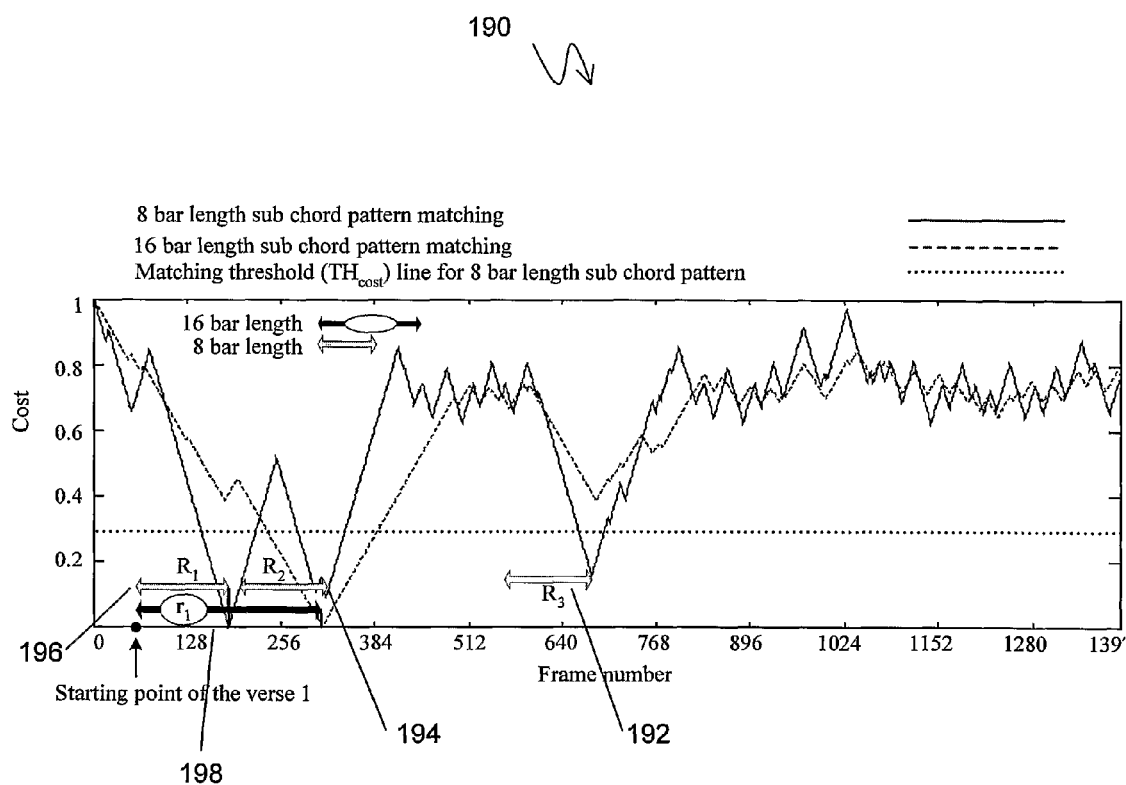
FIG. 12 illustrates an example of both 8 and 16 bar length chord patterns matching for determining melody-based similarity regions.

Referring now also to FIG. 12, there is shown the normalised matching costs of chord patterns identified for a song utilising an 8 or 16 bar observation window. As the window moves along the bars in the beat space segmented music signal, the normalised matching cost varies. The matching cost extremities (matching points) are detected and characterised as the end of the similar sub-chord patterns. The melody-based similarity region is the region preceding the matching point, equal in length to the detection window utilized (ie. 8 or 16 bars in this example). In the present case, when an 8 bar detection window length is used, there are 3 matching points 192, 194, 198 under the threshold. The 8-bar length regions $R_2$~$R_3$ have the same chord pattern as the first 8-bar chord pattern in verse 1 ($R_1$). When the matching pattern is extended to 16 bars ($r_1$), there is no other 16-bar region with the same chord pattern. Therefore the three regions $R_1$~$R_3$ are characterised as melody-based similarity regions.

Content-Based Similarity Region Detection

The melody-based similarity regions 192, 194, 196 can be further analysed to identify if they are also content-based similarity regions. Content-based similarity regions indicate multiple sections containing similar vocal content. This is particularly important for detecting the chorus of a song since it is the chorus which is most repeated, and hence, most recognised by a user.

Figure 13:
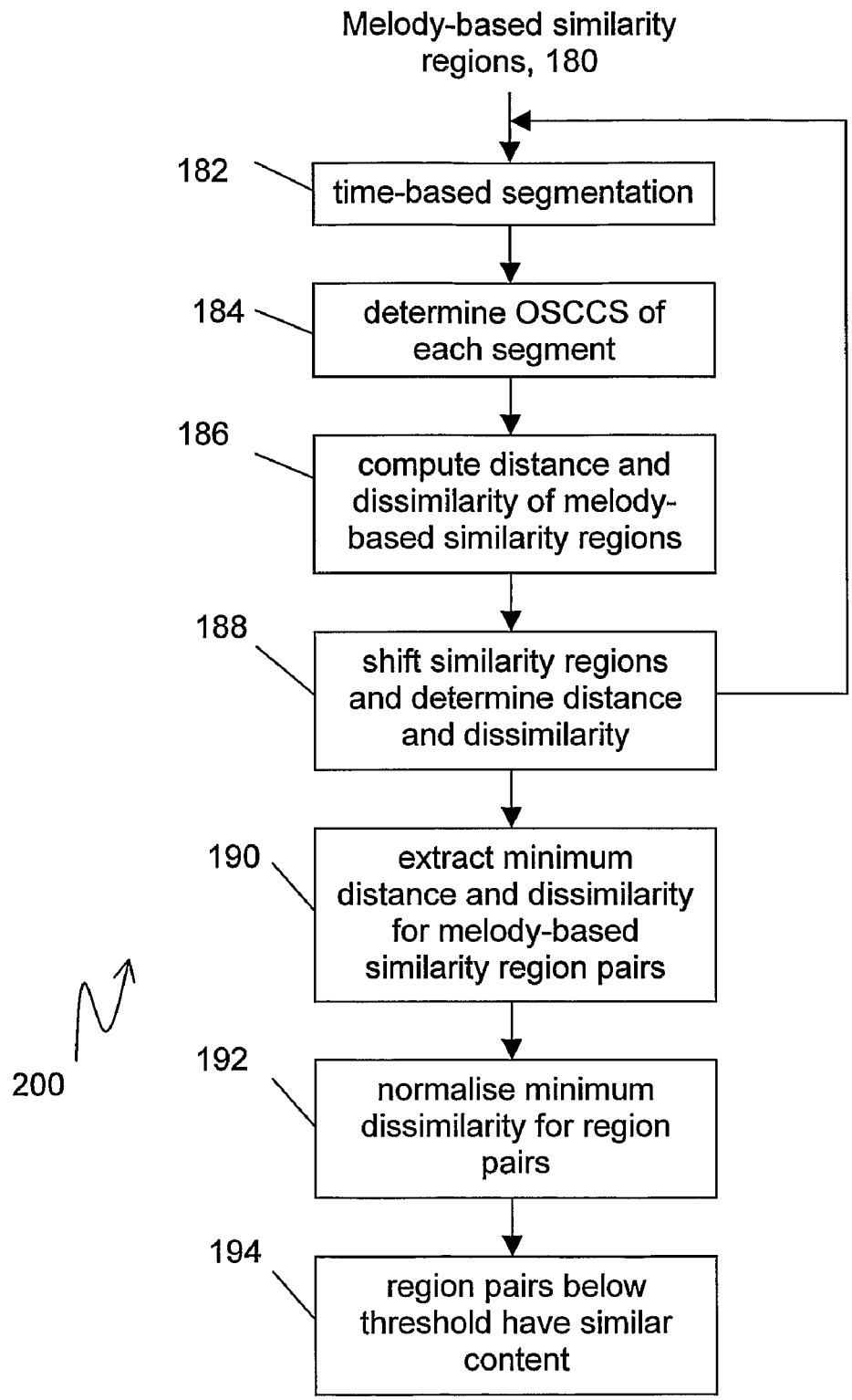
FIG. 13 is a flow chart illustrating the steps in determining content-based similarity regions.

FIG. 13 illustrates the steps in a process 200 which is used to determine content-based similarity regions.

Step 1: Two melody-based similarity regions 180 are sub-segmented (step 182), preferably into 30 ms segments with a 50% overlap. As previously discussed, OSCCs are highly sensitive to vocal content, and relatively insensitive to instrumental melody changes. Therefore, the OSCCs for each fixed-time segmented melody-based similarity region are extracted (step 184). The OSCCs are used to indicate the presence of vocals in the melody based similarity regions.

Step 2: The distance and dissimilarity between feature vectors of the melody-based similarity regions $R_i$ and $R_j$ are calculated (step 186) using Eq. (1) and Eq. (2) respectively.

$$dist_{R_iR_j}(k) = \frac{|V_i(k) - V_j(k)|}{|V_i(k)| * |V_j(k)|} \quad i \neq j \tag{5}$$

$$\text{dissimilarity}(R_i, R_j) = \sum_{k=1}^{n} \frac{dist_{R_iR_j}(k)}{n} \tag{6}$$

The dissimilarity($R_i$, $R_j$) gives the low value for the content-based similarity regions.

Step 3: It was previously discussed how errors could be introduced when detecting chords and chord patterns. To overcome the pattern matching errors which occur due to error chords, the melody-based similarity regions are shifted (step 188) back and forth and Steps 1 and 2 are repeated. Preferably, the shifting into the preceding/succeeding bars, is 4 bars in length, utilizing 2 bar increments. This allows the melody-based similarity regions with the minimum value of dissimilarity ($R_i$, $R_j$) to be detected.

Step 4: The minimum dissimilarity ($R_i$, $R_j$) is calculated (step 190) for all shifted region pairs, and then normalized (step 192). A lower normalised value indicates that the beat space segmented melody-based similarity regions have a similar vocal content. A suitable threshold ($TH_{smir}$) for detecting similar content-based regions is found to be 0.389.

Song Characterisation

Making reference again to FIG. 2, the music signal is characterised using detection of melody-based and content based similarity regions. To characterise the music signal, rules are applied based upon the structure of popular music. As new genres of music emerge and gain listeners, other rules may be required. Below is an example of rules which may be used to characterise the type of song:

① The typical song structure follows the verse-chorus pattern repetition as shown below.
  a. Intro, Verse 1, Chorus, Verse 2, Chorus, Chorus, Outro
  b. Intro, Verse 1, Verse 2, Chorus, Verse 3, Chorus, Middle eight or Bridge, Chorus, Chorus, Outro
  c. Intro, Verse 1, Verse 2, Chorus, Verse 3, Middle eight or Bridge, Chorus, Chorus, Outro
② The minimum number of verses and chorus' is 2 and 3 respectively.
③ The verse and chorus are 8 or 16 bars long.
④ The middle eight is 8 or 16 bars long. It has either the main key of a song or different keys. If the length of Middle eight is less than 8 bars it is identified as a bridge.

Chorus Detection Based on Song Type

Figure 14A:
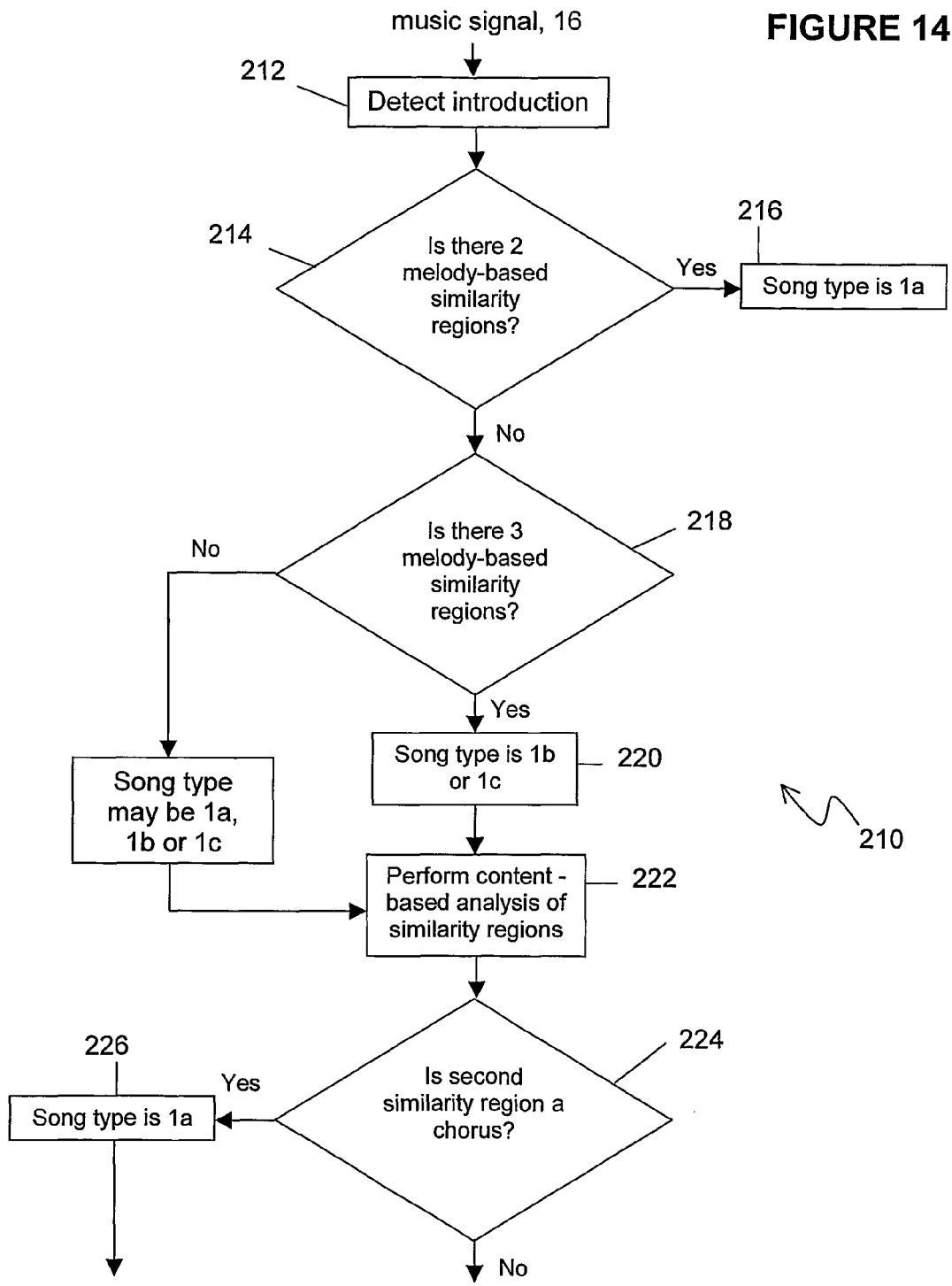
FIGS. 14a and 14b are flow charts illustrating the steps for characterising the song-type from the music signal.
Figure 14B:
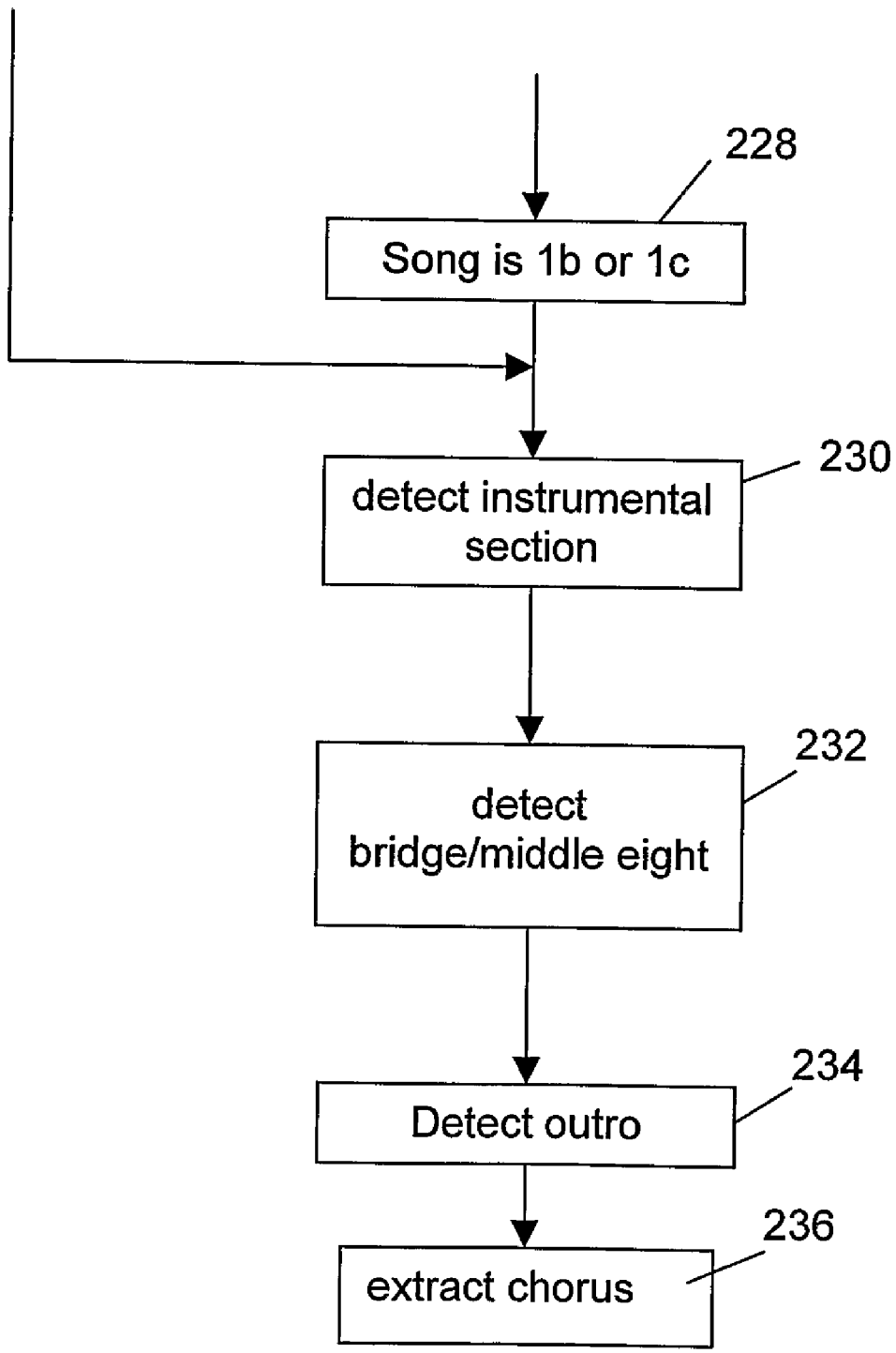

FIGS. 14a and 14b are flowcharts illustrating the steps of a process 210 to detect the chorus sections by characterising the music signal according to the above rules.

Typically, the Intro section is located before Verse 1. It was previously shown that vocal/instrumental boundaries could be detected by applying filters to the appropriate frequency bands of a music signal and extracting the OSCCs. Thus, we can identify the introductory section (step 212) which occurs before the 1$^{st}$ vocal region is identified. This section is identified as 'Intro'. If silent frames are detected at the beginning of the song, they are not considered as part of the Intro because they do not carry a melody.

Referring again to the aforementioned rules, since the end of the Intro is usually the beginning of Verse 1, it may be assumed that the length of Verse 1 is 8 or 16 bars and chord sequences of this length are used to find the melody-based similarity regions (step 214) in a music signal 16. If there are only 2 or 3 melody-based similarity regions detected, they are identified as the verses. Cases 1 and 2 (below) explain the detection and discrimination between chorus and verse:

Case 1: Two melody-based similarity regions are found, (step 216).

In this case, the song has the structure described in (①a). If the gap between verse 1 & 2 is equal and more than 24 bars, both the verse and the chorus each are 16 bars long. If the gap is less than 16 bars, both the verse and the chorus are 8 bars long. Using the chord pattern of the first chorus between verse 1 & 2, other chorus regions can be determined according to melody-based similarity detection 170. Since a bridge may appear between verse and chorus or vice versa, we align the chorus by comparing the vocal similarities of the detected regions according to content-based similarity.

Case 2: Three or more melody similarity regions are found, (step 218).

In this case, the song may follow the (①a), (①b) or the (①c) pattern. Thus the first chorus appears between verse 2 & 3 and we can find other chorus sections using a similar procedure to that described in Case 1. If there are more than 3 melody-based similarity regions found when attempting to detect the chorus regions, it implies that the chorus chord pattern is partially or fully similar to the verse chord pattern. Thus we detect the 8-bar length chorus sections are detected (may not be the full length of the chorus) by analyzing the vocal similarities in the melody-based similarity regions. Case 2a and Case 2b illustrate the discrimination of the verse and chorus sections.

Case 2a: If the second melody-based similarity region is found to be a part of a chorus (ie. it has content-based similarity with other regions), the song follows the (①a) pattern. If the gaps between melody-based similarity regions $R_1$ & $R_2$ and $R_2$ & $R_3$ are more than 8 bars, the verse and the chorus are each determined to be 16 bars long. Thus the chord pattern detection window length is increased to 16 bars and the verse sections are detected. After the verse sections are found, the chorus sections can be detected using a similar method as in Case 1.

Case 2b: If the second melody-based similarity region is found to be a verse (ie. it does not have content-based similarity compared against other regions), the song follows the (①b) or (①c) pattern (step 228). By checking the gaps between melody-based similarity regions R1 & R2 and R2 & R3, the length of the verse and chorus is similar to Case 2a. We can find the verse and chorus regions by applying similar procedure described in Case 3 and Case 1. If the neighbouring regions of verse 3 are determined to be chorus' the song type is (①b. If there is no chorus after verse 3, the song is assigned type ①c.

The Instrumental sections of a music signal 16 may have a similar melody to either the chorus or the verse. Therefore, the melody-based similarity regions which have only instrumental music are detected (step 230) as INSTs. However some INSTs have different melody. Preferably, a window of 4 bars is utilized to find regions which have INSTs.

The appearance of a bridge between a verse and chorus can be detected (step 232) by checking the gap between them. If the gap is long (typically more than 4 bars) and is only instrumental, it is considered as INST, otherwise it is detected as a bridge. If the gap has a different key it is detected as a middle eighth.

From the song patterns (①a, ①b, & ①c), it can be seen that before the Outro there is typically a chorus. The Outro is detected (step 234) as the section between the end of the last chorus and the end of the music signal 16.

Video Analysis

The purpose of video analysis is to detect repetitive lyrics from the video signal and align the detected chorus 36, 236 in the music signal 16 to create a continuous and meaningful music video thumbnail 50.

Figure 15:
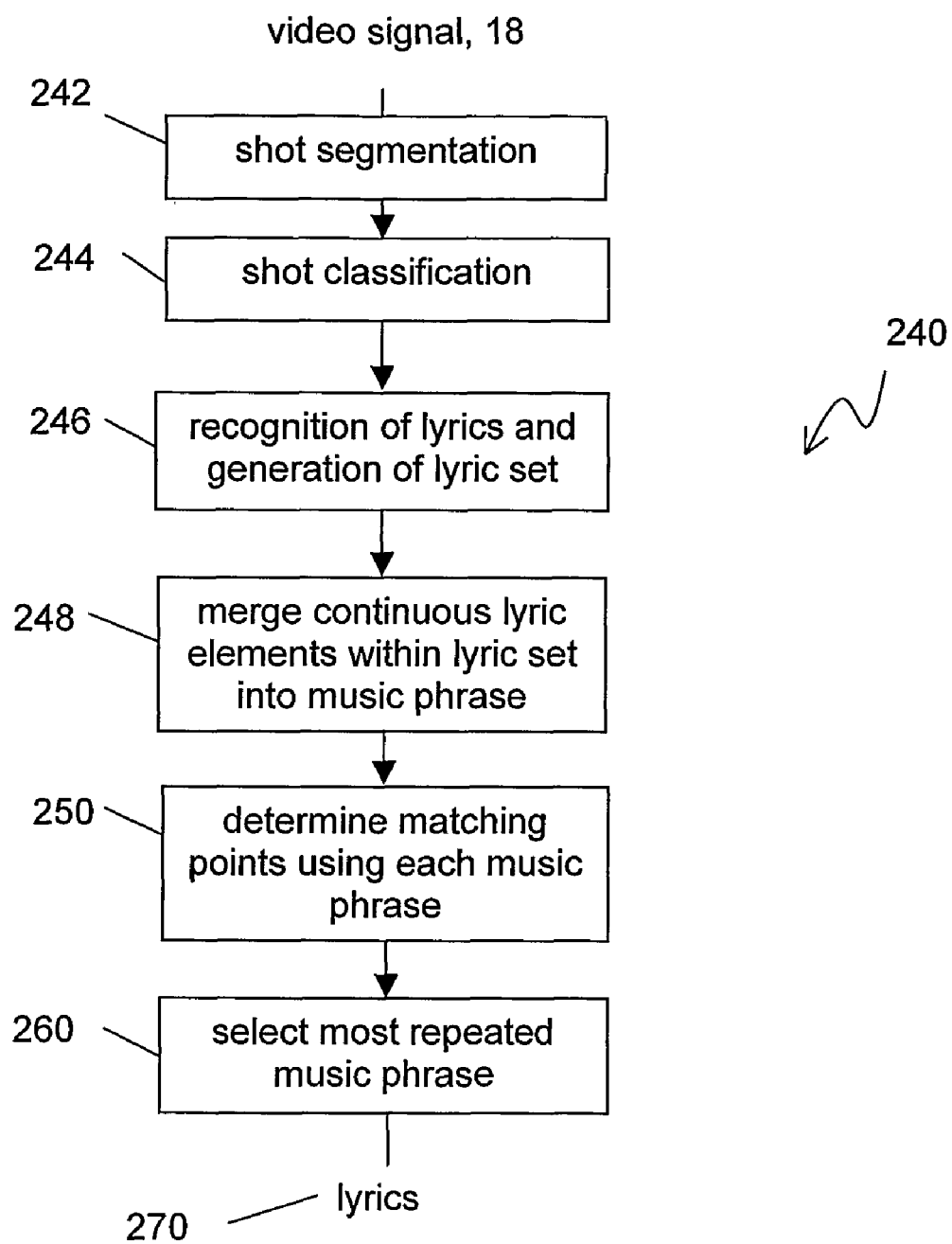
FIG. 15 is a flow chart of the processes for repetitive lyric detection.

FIG. 15 is a flowchart 240 illustrating the process of extracting lyrics from the video signal 18. The raw video sequence 18 is segmented (step 242) into a structured dataset where boundaries of all camera shots are identified. Shot segmentation is well known in the art and can be performed in a variety of ways. See for example, Bayesian video shot segmentation, by Nuno Vasconcelos and Andrew Lippman, *Neural Information Processing Systems*, Vol. 13, 2000. The original video sequence can be represented by the shot set $S=\{s_1, s_2, \ldots, s_n\}$ where n is the number of camera shots detected.

For each shot $s_i$, a key frame $f_i$ is chosen as a representative frame from within the shot. It is found that shot boundaries commonly contain transition frames which will blur the lyric caption. Therefore, to ensure the most salient lyrics appear stably in the shot, the representative frame $f_i$ is selected from the middle of the camera shot instead of from the shot boundaries.

The detected shots are classified (step 244) into two categories: close-up face shot and non-face shot. The appearance of a face-shot is an important characteristic in music videos 18, as it may indicate the presence of the main signer or actor/actress in the music video 18. Therefore, the music video thumbnail 50 should contain the face shots as the user is likely to recognise them. The face and non-face shots alternatively appear in the music video as the song progresses. The most salient difference between a close-up face shot and a non-face shot is camera motion and the features of the object (i.e. face). Therefore, short classification is based upon these two features:

(1) Camera motion: As the camera always follows the movement of the most important object, the camera motion provides a useful cue to represent the activity and characteristic of the object. The features of average motion magnitude, motion entropy, dominant motion direction, camera pan parameter, camera tilt parameter and camera zoom parameter are well known for determining camera motion and may be computed using the Motion Vector Field extracted from the compressed video.

(2) Face: Face is an important characteristic of a close-up shot. If faces are detected in the shot, it should be classified as a close-up face shot. Face detection is well known in the art and can be performed in a variety of ways. See for example, Statistical learning of multi-view face detection, by Li S. Z., Zhu L., Zhang Z. Q., Blake A., Zhang H. J. and Shum H., *European Conference on Computer Vision*, Denmark, May, 2002.

To accurately classify the shot candidates, the above features from individual shots should be fed into a classifier which executes a machine learning algorithm. The algorithm for machine learning is well known in the art and can be performed in a variety of ways. See for example, SVMTorch: Support Vector Machines for Large-Scale Regression Problems, by Collobert, R., and Bengio, S., *Journal of Machine Learning Research*. Vol 1, 2001, 143-160.

The classified shots are then utilised for lyric recognition and the generation of a lyric set 246. Given the representative frame set $F=\{f_1, f_2, \ldots f_n\}$, lyric detection is applied to each representative frame $f_i$. Lyric detection from video frames is well known in the art and can be performed in a variety of ways. See for example, Automatic location of text in video frames, by Hua X. S., Chen X. R., Liu W., Zhang H. J., *3rd International Workshop on Multimedia Information Retrieval*, Ottawa, 2001.

The frames containing the lyrics are used to generate the lyrics frame set F', where F'32 $\{f'_1, f'_2, \ldots f'_m\} \subset F$. For each frame in the lyrics frame set F', the content of each lyrics is recognized. The low resolution of video (typically 72 dpi) is a major source of problems in lyric recognition. Optical Character Recognition (OCR) systems have been designed to recognize text in documents, which were scanned at a resolution of at least 200 dpi to 300 dpi resulting in a minimal text height of at least 40 pixels. In order to obtain good results with standard OCR systems, it is necessary to enhance the resolution of the segmented text lines. Cubic interpolation is used to rescale the text height (originally about 20 pixels) while preserving the aspect ratio. Preferably, the rescaled text height should be at least 40 pixels.

The lyrics recognition results are saved in a lyrics set $C=\{c_1, c_2, \ldots, c_m\}$. Each element $C_i$ in this set corresponds to the text content of frame $f'_i$ in lyrics frame set F'. The repetitive music phrases which occur in the chorus are usually the most recognised words in a song and are therefore the most useful in a music video thumbnail. A music phrase may last for several shots in a music video. Therefore, a single music phrase may correspond to several continuous lyrics in the lyrics set C. To adjust for this, continuous lyrics are merged (step 248) to produce a music phrase set $P=\{p_1, p_2, \ldots, p_t\}$ "Given the music phrase set P, each music phrase (i.e., $p_i$) is matched with the lyrics set starting from this lyrics (i.e. $p_i$ $p_{i+1} \ldots P_t$)", as it has been proven efficient for string matching that allows errors, called approximate string matching. To match the lyrics $p_i$ (denoted as X) with the lyrics sequence starting from this lyrics (denoted as Y), an edit distance matrix $D_i(X,Y)$, is created which is defined as the minimum cost of a sequence of modification (insertion, deletions and substitution) that transforms X into Y. In the matrix, the element $D_i(k,l)$ represents the minimum number of modifications that are needed to match $X_{1 \ldots k}$ to $Y_{1 \ldots l}$. The algorithm can be described as following:

Initial: $D_i(k,0)=k$; $D_i(0,l)=0$; $1 \leq k \leq |X|$, $1 \leq l \leq |Y|$
Recurrence:

$$D_i(k, l) = \min \begin{cases} D_i(k-1, l-1) + \delta(X_k, Y_l) & \\ D_i(l-1, k) + 1 & 1 \leq k \leq |X| \\ D_i(l, k-1) + 1 & 1 \leq l \leq |Y| \end{cases}$$

where $\delta(X_k, Y_l)=0$ if $X_k=Y_l$ and 1 otherwise. $|X|$ and $|Y|$ denote the length of string X and Y respectively.

The rationale for above formula can be explained as follows. $D_i(k,0)$ and $D_i(0,l)$ represent the edit distance between a string of the length k or l and the empty string. For $D_i(k,0)$, clearly k deletions are needed on the nonempty string. While for $D_i(0,l)$, because any text position in Y may be the potential start matching point, first row of the matrix is set to zeros, which means the empty pattern matches with zero errors at any text position.

The last row of Matrix $D_i(X,Y)$ is defined as function $h_i(r), r=1 \ldots |Y|$. It measures how well the string X matches with different locations shifted by r in the string Y.

Figure 16:
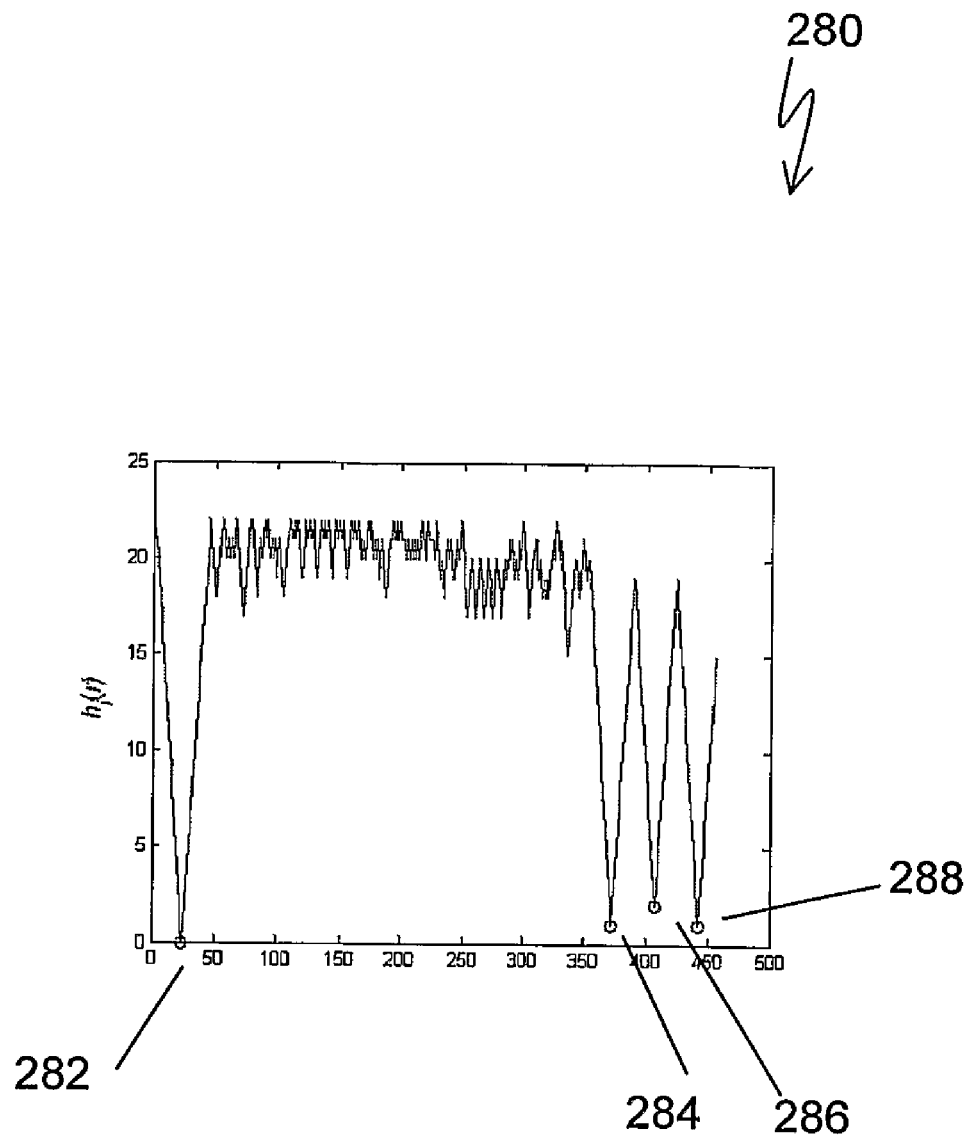
FIG. 16 illustrates one of the lyrics repetition detection results for the a music video.

Referring also now to FIG. 16 the lyrics repetition detection results for a video signal 18 is shown. It can be seen that except for $p_i$ itself (the first local minimum 282 denoted with a circle in FIG. 16), there are three other matching points 284, 286, 288, also denoted with circles. These three matching points do not equal to zero because of the OCR mistakes. A threshold is set to find the local minimum 250 of function $h_i(r)$. Preferably, the threshold is set to 2*(1-OCR accuracy) *(the length of text $p_i$).

Thus, the task to find the salient part of music can be converted to the task to find the most repeated music phrase (step 250) in the set P. The detailed algorithm is described below:

1) Take the first element in set P, and find the repeated music phrases in set P.

2) Select the first element in set P, together with its repeated music phrases found to construct a subset $R_j$. Meanwhile, delete these music phrases in set P. Increase j.

3) Repeat step 1) and 2) until P is empty.

The set $R=\{R_1, \ldots R_j, \ldots, R_k\}$ contains the k subsets, each subset $R_j$ representing a cluster containing the same music phrase in set P. The subset containing the most repeated music phrase (i.e. the most elements) is determined (step 260) and is denoted as $R^*_{opt}$. The most repeated lyrics are then extracted (step 270) for use in creating the music video thumbnail 50.

Music Video Thumbnail Generation

Figure 17:
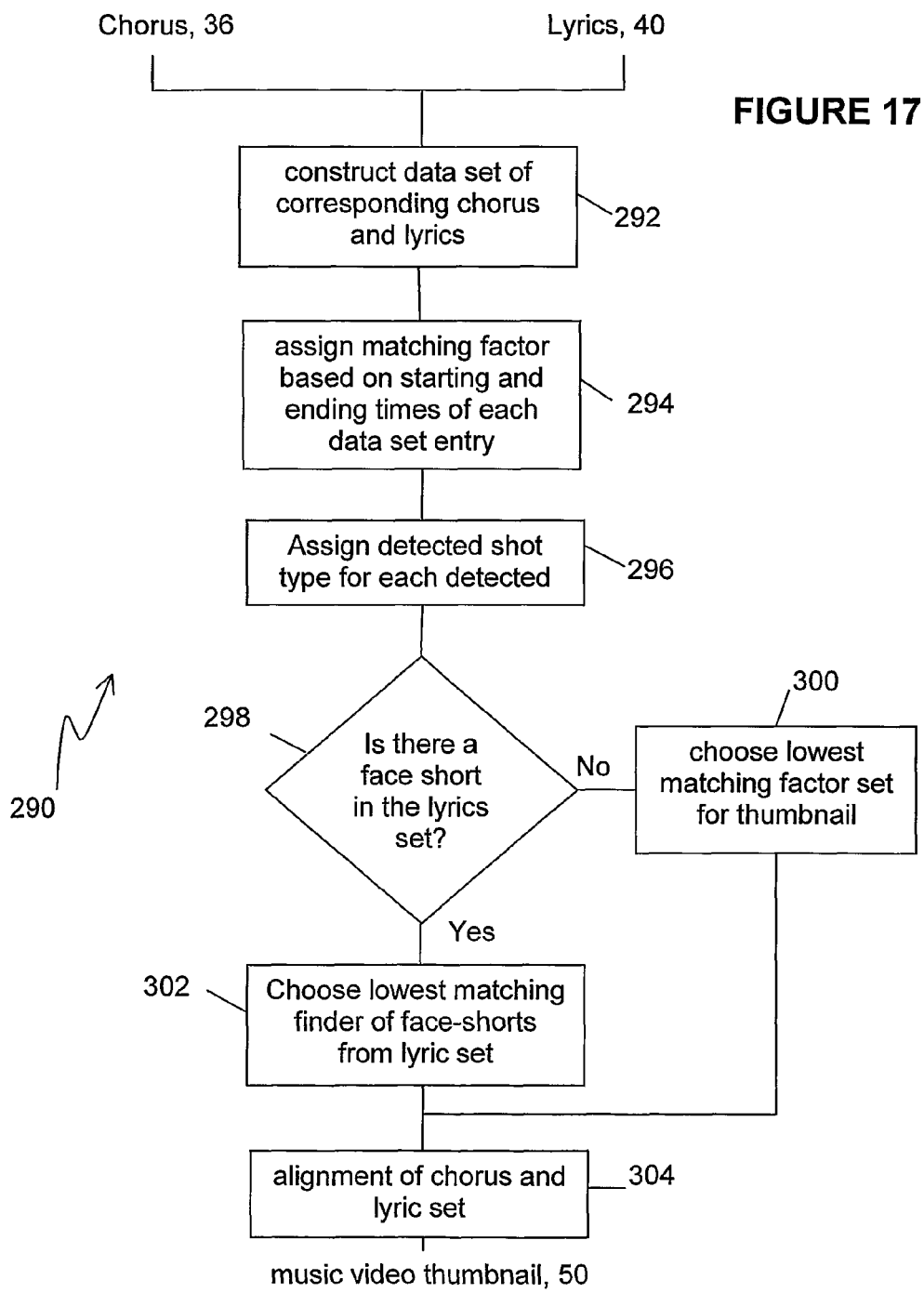
FIG. 17 is a flowchart of creating a music video thumbnail from the chorus and detected lyrics.
Figure 18:
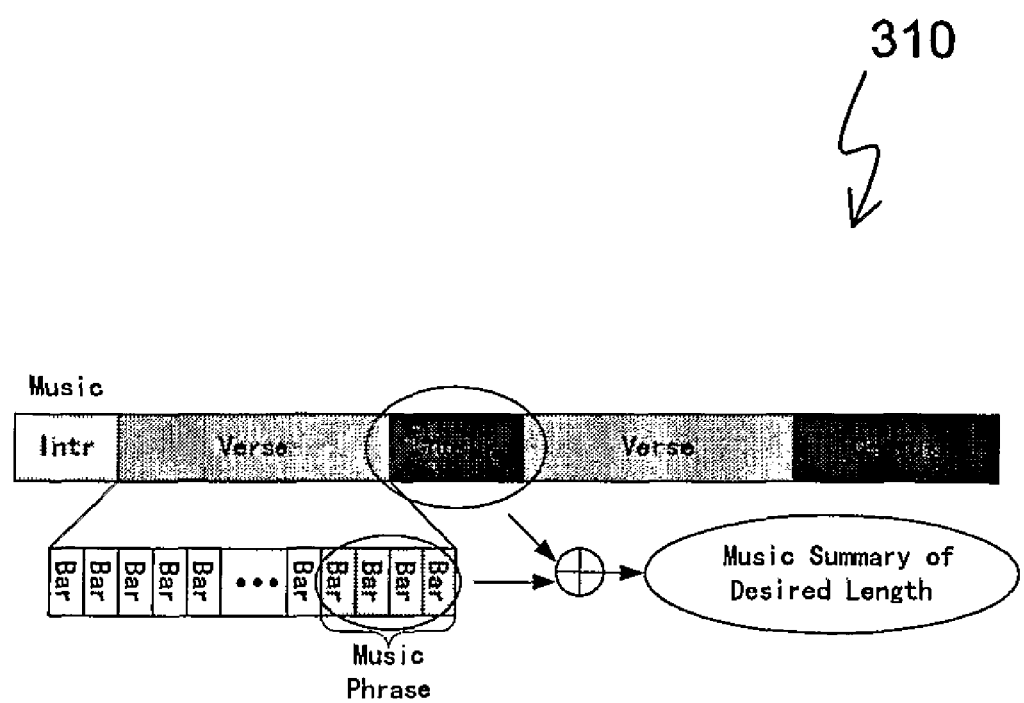
FIG. 18 illustrates how to include the music phrases anterior or posterior to selected chorus to get the desired length of the final music video thumbnail.

Referring now to FIG. 17, the music video thumbnail 50 is created based on the most salient part detected from both music signal 16 and video signal 18. For the music signal 16, the chorus 36 is the most repeated part of the song, and hence is the section which is extracted; while for the video signal 18, the most salient part contains the most repeated lyrics. However, since the chorus detected in the music signal is not always consistent in time with the most repeated lyrics detected in the video signal, the music and video signal components must be aligned to create the final music video thumbnail.

Assume the i-th chorus in a music signal is represented as: $chorus_i=<Start-B_i, End-B_i>$, and the corresponding lyrics are represented as: $lyrics_i=<LyricStart-B_i, LyricEnd-B_i>$. Generally, the time line of $Start-B_i$ is not equal to $LyricStart-B_i$, neither is $End-B_i$ equal to $LyricEnd-B_i$ due to two reasons. The first reason is that the lyrics in music video generally appear earlier and last longer than the singing voice in time line. This will result in $LyricStart-B_i$ less than $Start-B_i$ and $LyricEnd-B_i$ bigger than $End-B_i$. The second reason is that the shots which are considered as unstable (preferably those that last less than 0.3 seconds) are discarded in this approach. This will result in $LyricStart-B_i$ bigger than $Start-B_i$ and $LyricEnd-B_i$ less than $End-B_i$.

Utilising the above notation, the following steps are taken to align the music and video signals:

(1) Construct a dataset $\Phi$ containing all choruses and corresponding lyrics (step 292) in the song as the candidates set, denoted as $\Phi=\{(chorus, lyrics_1), \ldots, (chorus_i, lyrics_i), \ldots, (chorus_n, lyrics_n)\}$, where n is the number of choruses detected. For each chorus (i.e. the i-th chorus), it is represented using two time lines (i.e. $chorus_i=<Start-B_i, End-B_i>$) and each corresponding lyrics in the music video can be represented as: $lyrics_i=<LyricStart-B_i, LyricEnd-B_i>$.

(2) For each chorus in dataset $\Phi$, compare the start time and the ending time between chorus and its corresponding lyrics respectively as a matching factor (step 294) to measure how well these two elements (chorus and lyrics) are matched. For example, if the start time and the ending time of the lyrics (actually the start time and the ending time of the lyrics corresponding the shot boundaries) fall in the ±1 second of start time and the ending time of it corresponding chorus, we consider that this pair matching is better than the pair of ±2 deviation. The dataset $\Phi$ is than ordered according to this matching factor. In addition, for each chorus in dataset $\Phi$, the corresponding shot type (close-up face shot or non-face shot) is assigned (Step 296). The first pair in the matching factor order that contains a close-up face shot will be selected (step 302) as the seed to generate the music video summary, we denote it as (chorus*, lyrics*). If all shots corresponding to choruses in dataset $\Phi$ are non-face shots, then the first pair in dataset $\Phi$ in matching factor order will be selected (step 300) as the seed (chorus*, lyrics*) to create the music video thumbnail.

(3) Once the seed pair (chorus*, lyrics*) has been found, the music video thumbnail is created based upon them (step 304). For the seed pair (chorus*, lyrics*), the chorus is taken as the stable element, and the corresponding shots are aligned based upon its time interval (i.e. $Start-B_i$ to $End-B_i$).

Referring to FIG. 24, if the thumbnail is shorter than the required length, the preceding or succeeding music phrases will be integrated into the selected chorus to satisfy the length requirement for the thumbnail.

Computer Implementation

Figure 19:
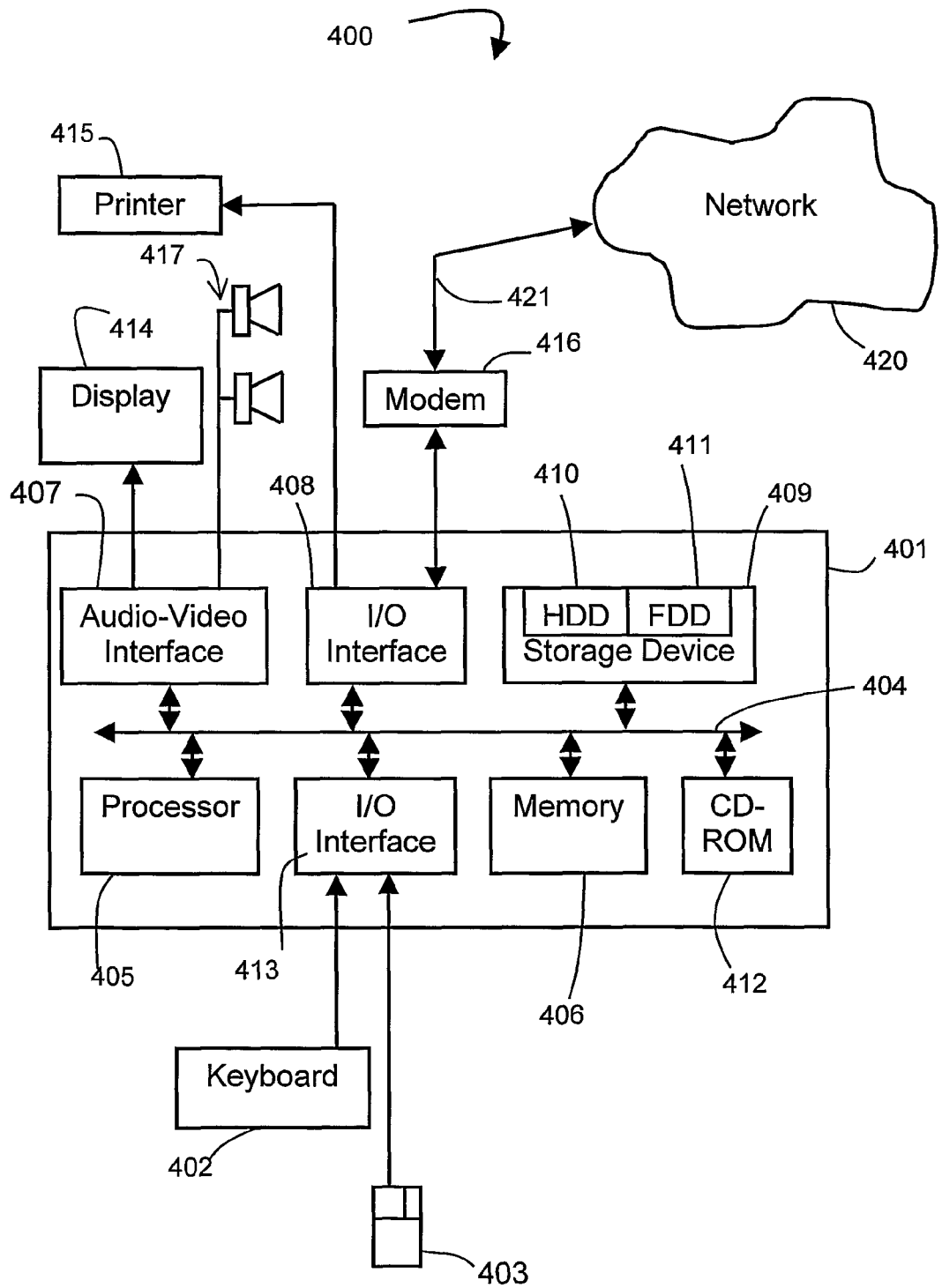
FIG. 19 is a schematic block diagram of a computer implementation which can be used to perform automatic music video thumbnail creation.

The method of automatic thumbnail creation for music videos is preferably practiced using a general-purpose computer system 400, such as that shown in FIG. 19 wherein the processes of FIGS. 1, 2, 4, 7, 11, 13, 14a, 14b, 15 and 17 may be implemented as software, such as an application program executing within the computer system 400. In particular, the steps of method of automatic thumbnail creation for music videos are effected by instructions in the software that are carried out by the computer. The instructions may be formed as one or more code modules, each for performing one or more particular tasks. The software may also be divided into two separate parts, in which a first part performs the automatic thumbnail creation for music videos methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for automatic thumbnail creation for music videos.

The computer system 400 is formed by a computer module 401, input devices such as a keyboard 402 and mouse 403, output devices including a printer 415, a display device 414 and loudspeakers 417. A Modulator-Demodulator (Modem) transceiver device 416 is used by the computer module 401 for communicating to and from a communications network 420, for example connectable via a telephone line 421 or other functional medium. The modem 416 can be used to obtain access to the Internet, and other network systems, such as a Local Area Network (LAN) or a Wide Area Network (WAN), and may be incorporated into the computer module 401 in some implementations.

The computer module 401 typically includes at least one processor unit 405, and a memory unit 406, for example formed from semiconductor random access memory (RAM) and read only memory (ROM). The module 401 also includes a number of input/output (I/O) interfaces including an audio-video interface 407 that couples to the video display 414 and loudspeakers 417, an I/O interface 413 for the keyboard 402 and mouse 403 and optionally a joystick (not illustrated), and an interface 408 for the modem 416 and printer 415. In some implementations, the modem 4116 may be incorporated within the computer module 401, for example within the interface 408. A storage device 409 is provided and typically includes a hard disk drive 410 and a floppy disk drive 411. A magnetic tape drive (not illustrated) may also be used. A CD-ROM drive 412 is typically provided as a non-volatile source of data. The components 405 to 413 of the computer module 401, typically communicate via an interconnected bus 404 and in a manner which results in a conventional mode of operation of the computer system 400 known to those in the relevant art. Examples of computers on which the described arrangements can be practised include IBM-PC's and compatibles, Sun Sparcstations or alike computer systems evolved therefrom.

Typically, the application program is resident on the hard disk drive 410 and read and controlled in its execution by the processor 405. Intermediate storage of the program and any data fetched from the network 420 may be accomplished using the semiconductor memory 406, possibly in concert with the hard disk drive 410. In some instances, the application program may be supplied to the user encoded on a CD-ROM or floppy disk and read via the corresponding drive 412 or 411, or alternatively may be read by the user from the network 420 via the modem device 416. Still further, the software can also be loaded into the computer system 400 from other computer readable media. The term "computer readable medium" as used herein refers to any storage or transmission medium that participates in providing instructions and/or data to the computer system 400 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 401. Examples of transmission media include radio or infrared transmission channels as well as a network connection to another computer or networked device, and the Internet or Intranets including e-mail transmissions and information recorded on Websites and the like.

The method of automatic thumbnail creation for music videos may alternatively be implemented in dedicated hardware such as one or more integrated circuits performing the functions or sub functions of automatic thumbnail creation for music videos. Such dedicated hardware may include graphic processors, digital signal processors, or one or more microprocessors and associated memories.

The invention claimed is:

1. A method for automatically creating a music video thumbnail of a music video signal, comprising the steps of:
   separating the music video signal into a music signal and video signal;
   extracting the sections of the music signal corresponding to the chorus by detecting similarity regions;
   determining repeated lyrics in the video signal;
   matching repeated lyrics with the corresponding chorus section;
   selecting a repeated lyrics and chorus pair; and
   aligning and combining said selected pair to create said music video thumbnail.

2. The method according to claim 1 wherein the step of extracting the chorus further includes the steps of:
   detecting instrumental regions;
   detecting melody-based similarity regions;
   detecting content-based similarity regions;
   applying rules based on the sequence of detected regions to determine the type of song; and
   extracting the chorus based on the determined type of song.

3. The method of claim 1 wherein the step of extracting the chorus further includes the step of:
   selecting the section corresponding to the chorus as a region identified as a melody-based similarity region and a content-based similarity region.

4. The method according to claim 1 wherein the step of extracting the chorus further includes the initial step of segmenting the music signal into frames, said frame length being equal to the duration of time between the shortest note detected in the music signal.

5. The method according to claim 4 wherein the step of segmenting the music signal into frames further includes the steps of:
   separating the music signal into frequency sub-band components;
   detecting onsets in the frequency sub-bands;
   determining the final series of onsets;
   taking the autocorrelation across the final series of onsets;
   detecting patterns of strong and weak onsets in the autocorrelated onsets; and,
   segmenting the music signal into frames based on the duration between strong and weak onsets.

6. The method according to claim 5 wherein the step of determining the final series of onsets further includes the step of taking the weighted sum of onsets detected in the music signal frequency sub-bands.

7. The method according to claim 2 wherein the step of detecting instrumental regions includes the steps of:
- separating the music signal into frequency sub-band components;
- applying filters to said components;
- extracting Octave Scale Cepstral Coefficients (OSCCs); and,
- determining instrumental regions based on singular value variation of said OSCCs.

8. The method according to claim 7 wherein the step of determining instrumental regions further includes the step of characterising regions of high singular value variation of OSCCs as instrumental regions.

9. The method according to claim 7 wherein the filters applied to the sub-band components are triangular filters.

10. The method according to claim 2 wherein detecting the melody-based similarity regions includes the steps of:
- detecting chords from the music signal;
- identifying a chord pattern for similarity determination;
- determining a matching cost of chord patterns in said detected chords;
- normalising said matching costs;
- locating matching points; and
- determining melody-based similarity regions based upon the location of said matching points.

11. The method according to claim 2 wherein the step of detecting content-based similarity regions includes the steps of:
- segmenting pairs of melody-based similarity regions into fixed-time intervals;
- determining the OSCCs for each fixed-time interval;
- calculating the dissimilarity for each melody-based region pair;
- shifting each of said melody-based region pairs and calculating the dissimilarity for each of said shifted region pairs;
- selecting the region pairs with the lowest dissimilarity from said melody-based region pairs and said corresponding shifted region pairs;
- normalising said minimum values of dissimilarity;
- selecting said region pairs with a normalised dissimilarity below a threshold as content-based similarity regions.

12. The method according to claim 11 wherein said normalised threshold is 0.389.

13. The method according to claim 1 wherein selecting a repeated lyrics and chorus pair includes the steps of:
- determining a matching factor for each repeated lyrics and chorus pair based on timing alignment;
- assigning a shot-type to each pair; and
- selecting a matching factor pair wherein:
- if any of the pairs contain a face-shot, the pair assigned the lowest matching factor and containing a face shot is selected; and
- if no pairs contain a face-shot, the pair assigned the lowest matching factor is selected.

14. A system for automatically creating a music video thumbnail of a music video signal, comprising:
- means for separating the music video signal into a music signal and video signal;
- means for extracting the sections of said music signal corresponding to the chorus by detecting similarity regions;
- means for determining repeated lyrics in said video signal;
- means for matching said repeated lyrics with a corresponding one of said chorus sections';
- means for selecting a repeated lyric and chorus pair; and
- means for aligning and combining said selected pair to produce said music video thumbnail.

15. A computer program product embodied on a computer readable medium and comprising code that, when executed, causes a computer to perform a method for automatically creating a music video thumbnail of a music video signal, said method comprising the steps of:
- separating the music video signal into a music signal and video signal;
- extracting the sections of the music signal corresponding to the chorus by detecting similarity regions;
- determining repeated lyrics in the video signal;
- matching repeated lyrics with the corresponding chorus section;
- selecting a repeated lyrics and chorus pair; and
- aligning and combining said selected pair to create said music video thumbnail.

* * * * *